(12) United States Patent
Hachiya et al.

(10) Patent No.: US 7,115,888 B2
(45) Date of Patent: Oct. 3, 2006

(54) LED DRIVING SEMICONDUCTOR CIRCUIT AND LED DRIVING APPARATUS INCLUDING THE SAME

(75) Inventors: Yoshiaki Hachiya, Otsu (JP); Ryutaro Arakawa, Amagasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/236,818

(22) Filed: Sep. 28, 2005

(65) Prior Publication Data

US 2006/0072324 A1    Apr. 6, 2006

(30) Foreign Application Priority Data

Oct. 1, 2004    (JP)    ............... 2004-290713

(51) Int. Cl.
*H01L 31/14*  (2006.01)
*H05B 37/02*  (2006.01)
*G09G 3/06*   (2006.01)

(52) U.S. Cl. ............. 250/552; 327/109; 315/291; 345/46

(58) Field of Classification Search ........ 250/551–553; 327/109, 514; 315/291, 224; 345/46, 82
See application file for complete search history.

(56) References Cited

U.S. PATENT DOCUMENTS 5,329,210 A * 7/1994 Peterson et al. ........... 315/246

5,381,018 A * 1/1995 Mojaradi et al. ........... 250/551
2004/0041526 A1  3/2004 Vollrath

FOREIGN PATENT DOCUMENTS

| DE | 197 32 828 | 2/1999 |
|----|------------|--------|
| DE | 102 30 103 | 1/2004 |
| JP | 2001-8443  | 1/2001 |
| JP | 2001-313423| 11/2001|
| WO | 2004/057921| 7/2004 |

* cited by examiner

*Primary Examiner*—Kevin Pyo
(74) *Attorney, Agent, or Firm*—Wenderoth, Lind & Ponack, L.L.P.

(57) ABSTRACT

A LED driving semiconductor circuit of the present invention includes a first input terminal connected to a light-emitting diode, a switching device block having a first FET and a first switching device, a reference voltage terminal which is connected to the first FET and outputs the reference voltage, a start/stop circuit which outputs a start signal when the reference voltage is equal to or larger than a predetermined value and outputs a stop signal when the reference voltage is less than the predetermined value, a current detection circuit which detects the current flowing through the first switching device, and a control circuit which controls ON/OFF of the first switching device intermittently at the predetermined frequency based on the output signal of the start/stop circuit and the output signal of the current detection circuit so that the constant current flows through the light-emitting diode.

15 Claims, 22 Drawing Sheets

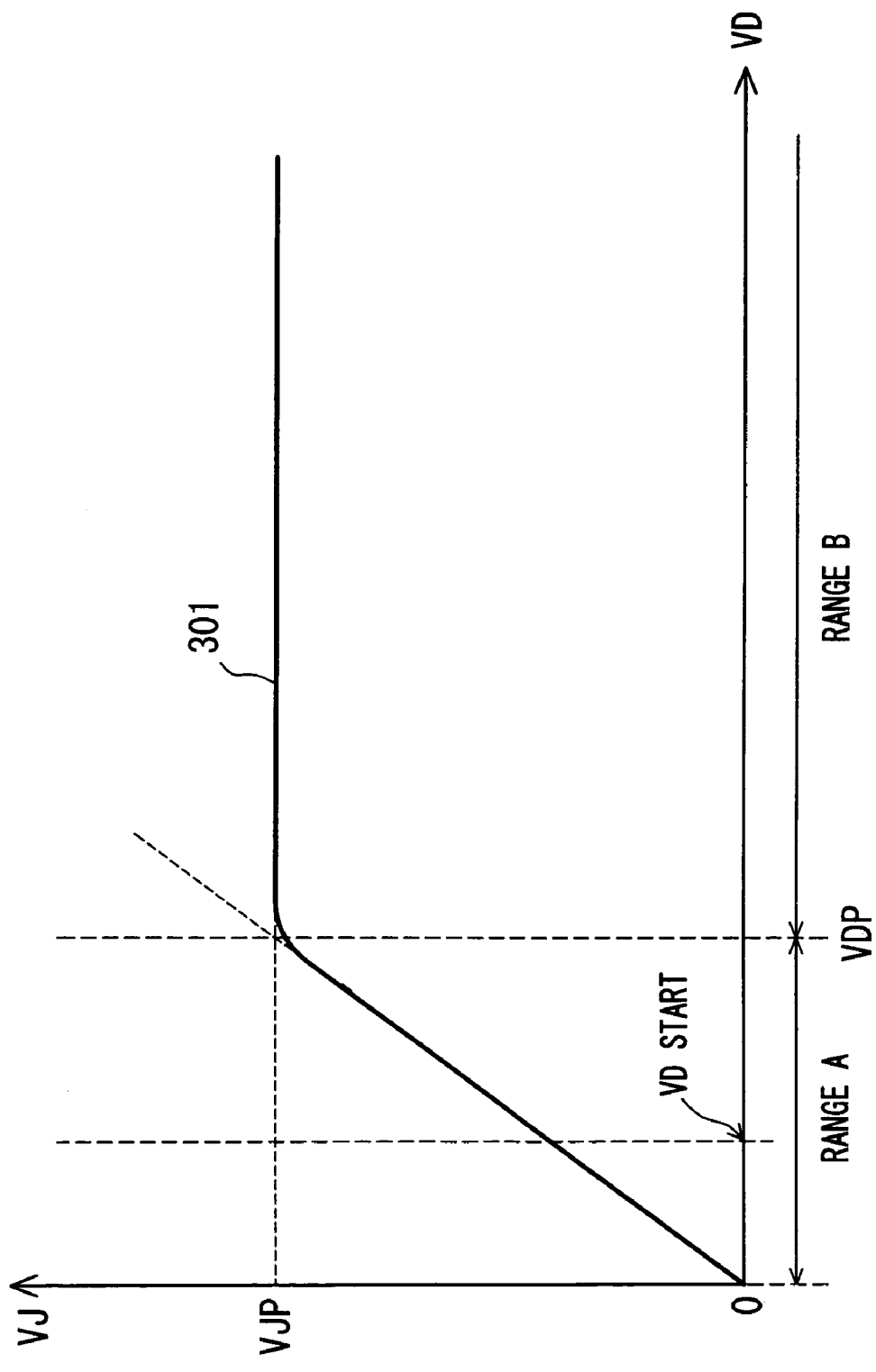

Fig. 9

LED DRIVING SEMICONDUCTOR CIRCUIT AND LED DRIVING APPARATUS INCLUDING THE SAME

BACKGROUND OF THE INVENTION

1. Field of the Invention

The present invention relates to a light-emitting diode (LED) driving semiconductor circuit and a light-emitting diode (LED) driving apparatus including the same. In particular, the present invention relates to a lighting apparatus using the light-emitting diode.

2. Description of the Related Art

In recent years, a LED driving semiconductor circuit and a LED driving apparatus including the same are developed and are put into practical use. A LED driving apparatus of a first prior art is disclosed in JP 2001-313423, (A patent document 1).

In the LED driving apparatus of the first prior art, a voltage boost chopper BUT includes an inductor L, a diode D (a light-emitting diode LED can also serve as the diode D) which is connected to the inductor L in series, and a switching element Q of which one end is connected to a connecting point between the inductor L and the anode of the diode D (in the explanation of the following prior art, reference symbols are those used in the drawings of the patent document 1).

The anode of the light-emitting diode LED is connected to the cathode of the diode D. The light-emitting diode LED is driven by the direct current output of the voltage boost chopper BUT.

The cathode of the light-emitting diode LED is connected to a light-emitting diode current-feedback circuit LFC. The LED driving apparatus of the first prior art controls the control circuit CC of the voltage boost chopper BUT, according to the detected signal of the light-emitting diode current-feedback circuit LFC, so as to average out the current of the light-emitting diode during a time range longer than the period of low-frequency ac current.

The on-control of the switching element Q is done when the inductor L releases energy. The off-control of the switching element Q is done according to the switching current or done when a predetermined time passed after the switching-on.

The other end of the switching element Q is connected to a switching current detection circuit SD. Between the light-emitting diode LED and the ground potential, an inductor current detection circuit LD 2316 is provided.

The above-mentioned circuit configuration provides the LED driving apparatus of the first prior art which achieves the excellent stability of the light-emitting diode current, low power loss, a low input current distortion, and comparatively low cost. However, there is a problem as is described below.

(1) Because of the voltage boost chopper BUT, while the switching device is off, no current flows through the light-emitting diode LED. Therefore, flickering occurs in the brightness of the light emission.

(2) Since a resistor SD and a resistor LD are used for the detection of the current flowing through the switching device Q and the light-emitting diode LED, the power loss by these resistors SD and LD is large. Particularly in the LED lighting apparatus, it is necessary to increase the current applied to the LED. In this case, in such a direct current detection method as in the method using SD and LD, the power loss increases.

(3) Since the input voltage is detected using resistors, the power loss occurs constantly by these resistors for detecting input voltage while the LED driving apparatus is working.

(4) Number of circuit components increases, leaving hindrance to the small-sizing of the LED driving apparatus. Particularly, in case of the bulb type LED lighting apparatus, it is unsuitable.

In order to solve the above-mentioned problem, the present invention purposes to provide a LED driving semiconductor circuit having a simple configuration and a low power-loss, and a LED driving apparatus including the same.

The present invention purposes to provide a LED driving semiconductor circuit, which is capable of controlling the current flowing through the light-emitting diode with a high accuracy responding to the input voltage fluctuation, and an LED driving apparatus including the same.

SUMMARY OF THE INVENTION

In order to solve the above problem, the present invention has a configuration described below.

A LED driving semiconductor circuit according to one aspect of the present invention is for controlling a light-emitting diode block having a choke coil to which a source voltage is applied from a voltage source, one or more light-emitting diode connected to the above-mentioned choke coil in series, and a diode that supplies a back electromotive force being generated in the above-mentioned choke coil to the above-mentioned light-emitting diode, the diode having one end thereof connected to the above-mentioned choke coil and the other end thereof connected to the above-mentioned light-emitting diode, and the LED driving semiconductor circuit includes a first input terminal connected to the above-mentioned light-emitting diode, a switching device block having a first FET of which one end is connected to the above-mentioned first input terminal or the above-mentioned voltage source, and a first switching device connected between the above-mentioned first input terminal and a ground potential, a reference voltage terminal that is connected to the other end of the above-mentioned first FET and outputs a reference voltage, a start/stop circuit that outputs a start signal when the above-mentioned reference voltage is equal to or more than a predetermined value, and outputs a stop signal when the above-mentioned reference voltage is less than the above-mentioned predetermined value, a current detection circuit that detects a current flowing from the above-mentioned first input terminal to the above-mentioned first switching device, and a control circuit that controls ON/OFF of the above-mentioned first switching device intermittently at a predetermined frequency based on the output signal of the above-mentioned start/stop circuit and the output signal of the above-mentioned current detection circuit so that the constant current flows through the above-mentioned light-emitting diode.

By constituting as described above, when the first switching device is in ON state, the current flows from the choke coil to the light-emitting diode and then to the first switching device. When the first switching device is in OFF state, the current flows from the choke coil to the light-emitting diode and then to the diode in a circuit loop constituted of the choke coil, the light-emitting diode and the diode. The present invention acts as a voltage drop chopper.

According to the present invention, a LED driving semiconductor circuit having high power-conversion efficiency can be realized. According to the present invention, a small-sized LED driving semiconductor circuit with a small number of parts can be realized. According to the present invention, a LED driving semiconductor circuit controls the current that flows through the light-emitting diode by the constant current even when the input voltage fluctuates.

In the above-mentioned LED driving semiconductor circuit according to another aspect of the present invention, the above-mentioned switching device block is constituted by connecting the above-mentioned first FET and the above-mentioned first switching device in series between the first input terminal and the ground potential.

The present invention is suitable for the case that the first FET and the first switching device are comprised in the same package. According to the present invention, since it becomes possible to supply the electric power from the switching device block to the control circuit, power loss due to such as an actuating resistor becomes small, hence a LED driving semiconductor circuit having a high power conversion efficiency can be realized.

In the above-mentioned LED driving semiconductor circuit according to another aspect of the present invention, the above-mentioned switching device block is constituted with the above-mentioned first FET connected between the above-mentioned first input terminal and the above-mentioned reference voltage terminal, and the above-mentioned first switching device connected between the above-mentioned first input terminal and the ground terminal.

The present invention is suitable for the case that the first FET and the first switching device are comprised in separated packages. According to the present invention, since it becomes possible to supply the electric power from a switching device block to the control circuit, power loss due to such as an actuating resistor becomes small, hence a LED driving semiconductor circuit having a high power conversion efficiency can be realized.

The above-mentioned LED driving semiconductor circuit according to another aspect of the present invention further has a second input terminal to which the source voltage of the above-mentioned voltage source is inputted, and the above-mentioned switching device block is constituted with the above-mentioned first FET connected between the above-mentioned second input terminal and the above-mentioned reference voltage terminal, and the above-mentioned first switching device connected between the above-mentioned first input terminal and the ground potential.

By the pinch-off effect due to the first FET, a high voltage applied on the high potential side of the first FET is pinched off at a low voltage on the low potential side of the first FET. Since it becomes possible to supply the electric power from the switching device block to the control circuit, power loss due to such as an actuating resistor becomes small, hence a LED driving semiconductor circuit having a high power conversion efficiency can be realized. According to the present invention, during the operation of the first switching device is halted (while the OFF state), it can be prevented that the light-emitting diode emits a small amount of light.

The above-mentioned LED driving semiconductor circuit according to another aspect of the present invention has a regulator between the above-mentioned first FET and the above-mentioned reference voltage terminal.

According to the present invention, since the reference voltage during the operation of the control circuit can be kept constant, the semiconductor circuit can control the first switching device stably.

In the above-mentioned LED driving semiconductor circuit according to another aspect of the present invention, the above-mentioned current detection circuit detects the current of the above-mentioned first switching device by detecting the ON voltage of the above-mentioned first switching device.

According to the present invention, by detecting the ON voltage of the first switching device, a current detection of the switching device with a reduced power loss, that is, the detection of peak value of the current flowing through the light-emitting diode can be realized. According to the present invention, a LED driving semiconductor circuit with high power conversion efficiency can be realized.

In the above-mentioned LED driving semiconductor circuit according to another aspect of the present invention, a second switching device having a small current fractional ratio with respect to the current flowing through the first switching device, and a resistor connected to the above-mentioned second switching device in series, are connected in parallel to the above-mentioned first switching device and between the above-mentioned first input terminal and the ground potential, wherein the above-mentioned current detection circuit detects the current flowing through the above-mentioned first switching device by detecting a voltage across the above-mentioned resistor.

In the present invention, even when the first switching device turns on from off, the current flowing through the first switching device can be detected accurately. In the present invention, since no large current is detected directly by a resistor, a current detection of the switching device with reduced power loss, that is, the detection of peak value of the current flowing through the light-emitting diode can be realized. According to the present invention, a LED driving semiconductor circuit with high power conversion efficiency can be realized.

The above-mentioned LED driving semiconductor circuit according to another aspect of the present invention further has a third input terminal through which a detection reference voltage is applied, and the above-mentioned control circuit adjusts the light-emission brightness of the above-mentioned light-emitting diode by changing the ON-period of the above-mentioned first switching device according to the above-mentioned detection reference voltage applied from outside to the above-mentioned third input terminal.

The present invention can realize a LED driving semiconductor circuit having a dimmer control function with high power conversion efficiency.

The above-mentioned LED driving semiconductor circuit according to another aspect of the present invention further has an input voltage detection circuit connected to the low potential side of the above-mentioned first FET, and only when the detection voltage of the above-mentioned input voltage detection circuit is equal to or larger than a certain predetermined value, the above-mentioned control circuit controls ON/OFF of the above-mentioned first switching device intermittently.

According to the present invention, dispersion of the start-up voltage of the ON/OFF control by the control circuit can be reduced. Since the input voltage is not detected directly by using a resistor, the present invention can realize a LED driving semiconductor circuit having a function of detecting an input voltage with high power conversion efficiency.

The above-mentioned LED driving semiconductor circuit according another aspect of the present invention further has a fourth input terminal to which the above-mentioned source voltage or the output voltage of the above-mentioned light-emitting diode is inputted via a resistor. The high potential side of the above-mentioned first FET is connected to the above-mentioned fourth input terminal, and the detection voltage of the above-mentioned input voltage detection circuit is adjusted by the above-mentioned resistor.

According to the present invention, the pinch-off voltage of the voltage on the low potential side with respect to the voltage on the high potential side in the first FET of the switching device block can be adjusted by using a resistor. The present invention can realize a LED driving semiconductor circuit in which the input voltage detection value is easily changeable. The present invention can realize a LED driving semiconductor circuit having high power conversion efficiency and the function of detecting the input voltage.

The above-mentioned LED driving semiconductor circuit according to another aspect of the present invention further has a second FET connected to the above-mentioned first input terminal to which the output voltage of the above-mentioned light-emitting diode is inputted or connected to the above-mentioned second input terminal to which the above-mentioned source voltage is inputted, and a changeover switch circuit of which one end is connected to either of the above-mentioned first FET or the above-mentioned second FET and the other end is connected to the above-mentioned regulator. The above-mentioned changeover switch circuit is connected to the above-mentioned first FET while the above-mentioned detection voltage of the above-mentioned input voltage detection circuit is smaller than a predetermined value, and is connected to the above-mentioned second FET when the above-mentioned detection voltage is equal to or larger than the predetermined value.

According to the present invention, the power loss due to a resistor for adjusting the input voltage detection value after a detection voltage reached to a predetermined value can be reduced. According to the present invention, it can be realized that a LED driving semiconductor circuit having the function of detecting the input voltage has higher power conversion efficiency than that of the aforementioned invention.

The above-mentioned LED driving semiconductor circuit according to another aspect of the present invention further has an overheating protection circuit that detects the temperature of the above-mentioned first switching device, and the above-mentioned control circuit turns the above-mentioned first switching device off when the temperature detected by the above-mentioned overheating protection circuit is higher than a predetermined temperature.

According to the present invention, further safety securing of the LED driving semiconductor circuit can be realized.

A LED driving apparatus according to one aspect of the present invention has a light-emitting diode block including a choke coil to which a source voltage is applied from a voltage source, one or more light-emitting diode connected to the above-mentioned choke coil in series, and a diode of which one end is connected to the above-mentioned choke coil and the other end is connected to the above-mentioned light-emitting diode, the diode supplying the back electromotive force being generated in the above-mentioned choke coil to the above-mentioned light-emitting diode, and the above-mentioned LED driving semiconductor circuit that controls the light-emitting block.

By constructing as described above, when the first switching device is in ON state, the current flows from the choke coil to the light-emitting diode and then to the first switching device. When the first switching device is in OFF state, the current flows in the direction of the choke coil to the light-emitting diode and then to the diode in a loop consisting of the choke coil, the light-emitting diode and the diode. The present invention works as a voltage-drop chopper.

According to the present invention, a LED driving apparatus having high power-conversion efficiency can be realized. According to the present invention, a small-sized LED driving apparatus with a small number of parts can be realized. According to the present invention, a LED driving apparatus can control the current flowing through the light-emitting diode to a constant current even when the input voltage fluctuates.

In the above-mentioned LED driving apparatus according to another aspect of the present invention, the above-mentioned light-emitting diode block further has a reverse voltage breakdown prevention circuit that prevents reverse voltage from being applied to the above-mentioned light-emitting diode.

According to the present invention, when the reverse voltage may be applied to the light-emitting diode, it is possible to prevent the breakdown of the light-emitting diode.

In the above-mentioned LED driving apparatus according to another aspect of the present invention, the reverse recovery time of the above-mentioned diode is not more than 100 nsec.

According to the present invention, in the transient state in which the first switching device turns on from off, power loss in the diode can lower.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 3 is a graph showing a relation between voltage VD and voltage VJ of the embodiment 1 of the present invention.

FIG. 9 is a circuit diagram of a LED driving apparatus of an embodiment 4 of the present invention.

It will be recognized that some or all of the drawings are schematic representations for purposes of illustration and do not necessarily depict the actual relative sizes or locations of the elements shown.

DETAILED DESCRIPTION OF THE PREFERRED EMBODIMENTS

The preferred embodiments according to the present invention will be described below with reference to the accompanying drawings.

<<Embodiment 1>>

Figure 1:
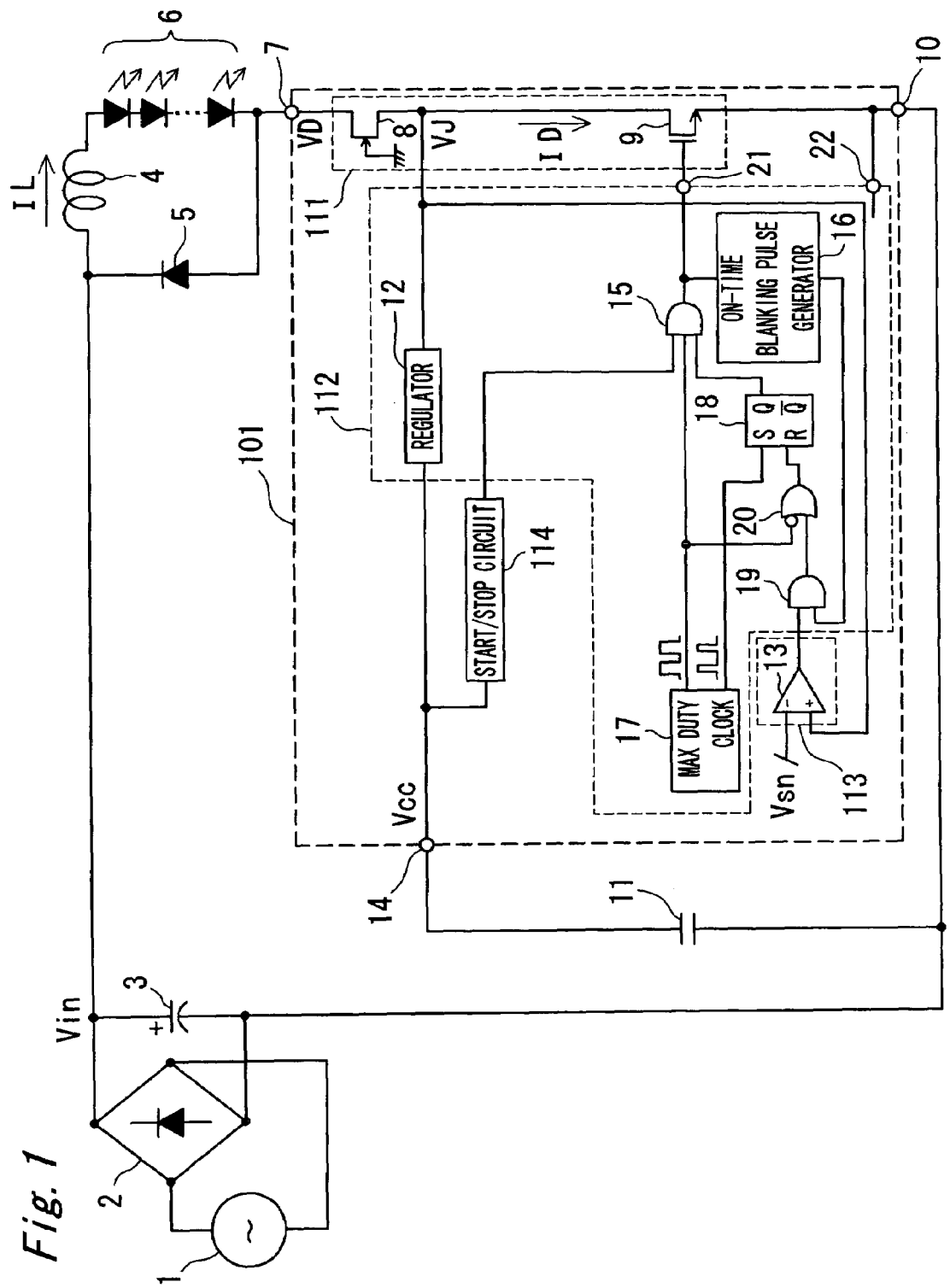
FIG. 1 is a circuit diagram of a LED driving apparatus of an embodiment 1 of the present invention.

With reference to FIGS. 1 to 4, a LED driving semiconductor circuit and a LED driving apparatus including the same of an embodiment 1 according to the present invention will be described below. FIG. 1 is a circuit diagram showing the LED driving apparatus of an embodiment 1 of the present invention.

In FIG. 1, an AC power source 1 (voltage source) outputs a source voltage. The both ends of the AC power 1 are connected to the both ends on one side of a rectification circuit 2. Both ends on the other side of the rectification circuit 2 are connected to a smoothing capacitor 3 for stabilizing the source voltage. The source voltage outputted by the AC power source 1 is rectified by the rectification circuit 2 and is smoothed by the smoothing capacitor 3, becoming to a direct-current (DC) voltage Vin.

The LED driving apparatus of the embodiment 1 of the present invention has a light-emitting diode block (which includes a choke coil 4, a diode 5, and a light-emitting diode 6), a LED driving semiconductor circuit 101 which controls the light-emitting diode block, and a capacitor 11 connected to the LED driving semiconductor circuit 101. In the LED driving apparatus of the present invention shown in FIG. 1, although a DC voltage Vin is inputted as the input voltage, it is also possible to input the output voltage of a DC source voltage in place of the AC power source 1.

In the LED driving apparatus of the embodiment 1 according to the present invention, one end of the choke coil 4 is connected to the high potential side of the smoothing capacitor 3 and a DC voltage Vin is applied to it. The other ends of the choke coil 4 are connected to an anode terminal of the light-emitting diode 6.

The light-emitting diode(s) 6 includes a light-emitting diode or a group of a plural number of light-emitting diodes which are connected in series. The light-emitting diode 6 is connected in series with the choke coil 4. A cathode terminal of the light-emitting diode 6 is connected to an anode terminal of the diode 5.

A cathode terminal of the diode 5 is connected to a connecting point between the high potential side of the smoothing capacitor 3 and the choke coil 4. The diode 5 is connected in parallel with the choke coil 4 and the light-emitting diode 6 to supply the back electromotive force occurring in the choke coil 4 to the light-emitting diode 6.

A DRAIN terminal 7 (first input terminal) of the LED driving semiconductor circuit 101 of the embodiment 1 of the present invention is connected to the cathode terminal of the light-emitting diode 6. The LED driving semiconductor circuit 101 inputs an output voltage of the light-emitting diode 6 through the DRAIN terminal 7 and controls the light-emitting diode block.

The LED driving semiconductor circuit 101 has a VCC terminal (reference voltage terminal) 14 that outputs reference voltage Vcc and the GND/SOURCE terminal 10 that is connected to the ground potential, and a capacitor 11 is connected between the VCC terminal 14 and the GND/SOURCE terminal 10.

The LED driving semiconductor circuit 101 has a switching device block 111 between the DRAIN terminal 7 and the GND/SOURCE terminal 10. The switching device block 111 controls a current flowing through the light-emitting diode 6.

The switching device block 111 is composed of a series connection of a junction-type FET 8 (first junction FET) and a switching device 9 (first switching device). In the embodiment 1, the switching device 9 is an N-type MOSFET.

In the switching device block 111, the one end (high potential side) of the junction FET 8 is connected to the DRAIN terminal 7 and the other end (low potential side) is connected to the one end of the switching device 9. The other end of the switching device 9 is connected to the GND/SOURCE terminal 10. In the embodiment 1, the junction-type FET 8 and the switching device 9 are included in the same package.

The LED driving semiconductor circuit 101 has a control circuit 112 to control the switching device block 111, which is connected to the connecting point between the junction-type FET 8 and the switching device 9, and the control terminal of the switching device 9. The terminal 22 of the control circuit 112 is connected to a ground potential.

The voltage (voltage of DRAIN terminal 7) on the high potential side of the junction-type FET 8 is denoted as VD and the voltage on the low potential side as VJ. The control circuit 112 outputs the output signal to change over the ON/OFF of the switching device 9 based on the voltage VJ. By the changing over of the ON/OFF of the switching device 9, the current flowing through the light-emitting diode 6 is controlled.

The LED driving semiconductor circuit 101 further has a drain current detection circuit 113 to detect the current flowing through the switching device block 111 and a start/stop circuit 114 to control the start/stop of the operation of the switching device block 111.

Now explanation is given on the internal circuit of the control circuit 112, the drain current detection circuit 113, and the start/stop circuit 114. One end of a regulator 12 is connected between the junction-type FET 8 and the switching device 9 of the switching device block 111 and the other end is connected to the VCC terminal 14. The voltage VJ is inputted to the regulator 12 and a reference voltage Vcc of a certain predetermined value is outputted therefrom.

The one end of the start/stop circuit 114 is connected between the regulator 12 and the VCC terminal 14. The reference voltage Vcc is inputted to the start/stop circuit 114. When the reference voltage Vcc is higher than or equal to a predetermined value, a start signal (which is an output signal of High) is outputted, when the reference voltage Vcc is lower than the predetermined value, a stop signal (which is an output signal of Low) is outputted. The output signal of the start/stop circuit 114 is inputted to an AND circuit 15 which is connected to the other end thereof.

An oscillator 17 outputs MAX DUTY signal and CLOCK signal. The MAX DUTY signal outputted from the oscillator 17 is inputted to the AND circuit 15, and the CLOCK signal is inputted to the set terminal of an RS flip flop circuit 18.

The drain current detection circuit 113 is composed of a comparator 13. The positive terminal of the comparator 13 is connected to the connecting point between the low potential side of the junction-type FET 8 and the regulator 12. The voltage VJ is inputted to the positive terminal of the comparator 13 and the detection reference voltage Vsn is inputted to the negative terminal.

The comparator 13 outputs High when the voltage VJ is larger than the detection reference voltage Vsn and outputs Low when the voltage VJ is smaller than the detection reference voltage Vsn. The current flowing through the switching device 9 is detected by comparing the ON voltage of the switching device 9 with the detection reference voltage Vsn. According to this detection reference voltage Vsn, the light emission brightness of the light-emitting diode 6 can be preset. The output signal of the comparator 13 is inputted to an AND circuit 19 connected to the output terminal of the comparator 13.

The AND circuit 19 is also connected to an ON-time blanking pulse generator 16. The ON-time blanking pulse generator 16 inputs the output signal of the AND circuit 15 and outputs the pulse to provide the time during which no current is detected to the AND circuit 19. The ON-time blanking pulse generator 16 outputs the output signal of Low for some constant time (e.g. hundreds nsec) after switching device 9 switches over from OFF to ON. The ON-time blanking pulse generator 16 outputs the output signal of High for the rest of time.

The output signal of the drain current detection circuit 113 and the output signal of the ON-time blanking pulse generator 16 are inputted to the AND circuit 19. When both signals are High, the AND circuit 19 outputs High. The AND circuit 19 outputs Low for the rest of time. The malfunction of the ON/OFF control of the switching device 9 caused by the ringing occurring when the switching device 9 is switched over to the ON state from the OFF state is prevented by inputting the output signal of the ON-time blanking pulse generator 16 and the output signal of the drain current detection circuit 113 to the AND circuit 19.

The output signal of the AND circuit 19 is inputted to an OR circuit 20 connected to the output terminal of the AND circuit 19. The OR circuit 20 is connected to the AND circuit 19 and the oscillator 17. The output signal of the AND circuit 19 and an inverted signal of MAX DUTY signal of the oscillator 17 are inputted to the OR circuit 20. When at least either one signal is High, the OR circuit 20 outputs High. When both signals are Low, the OR circuit 20 outputs Low.

The output signal of the OR circuit 20 is inputted to the reset terminal of the RS flip flop circuit 18. The CLOCK signal outputted from the oscillator 17 is inputted to the set terminal of the RS flip flop circuit 18 and the output signal of the output terminal Q of the RS flip flop circuit 18 is outputted to the AND circuit 15. That is, the on-duty of the switching device 9 is governed by the output signal of the OR circuit 20 to which the inverted signal of the MAX DUTY signal of oscillator 17 and the output signal of drain current detection circuit 113 are inputted.

The output signal of the start/stop circuit 114, the MAX DUTY signal of the oscillator 17, and the output signal of the RS flip flop circuit 18 are inputted to the AND circuit 15. When all of them are High, the AND circuit 15 outputs High and when it is in other case, the AND circuit 15 outputs Low. The output terminal of the AND circuit 15 is connected to a control terminal of the switching device 9 through a GATE terminal 21. The switching device 9 switches over ON and OFF based on the output signal (which is ON/OFF control signal) of the AND circuit 15.

In general, when the switching device 9 switches ON from OFF, a transitional current flows due to C (capacitance) of the switching device itself, or C (capacitance) or L (inductance) due to the wiring length. Also, the voltage between drain and source of the switching device 9 is declining from the input voltage Vin to the ON voltage for some constant time (generally, hundreds n-sec) after switching device 9 switches over to ON from OFF. Therefore, while the voltage declines to ON voltage, even if the drain current detection circuit 113 compares the ON voltage with the detection reference voltage Vsn, the drain current ID cannot be detect correctly. Accordingly, if the control circuit 112 operates based on this drain current, the control circuit 112 becomes unable to perform a stable ON/OFF control. Therefore, the control circuit 112 provides a period of which the current is not detected by using the ON-time blanking pulse generator 16, and prevents use of a wrong detection result of the drain current detection circuit 113.

Figure 2:
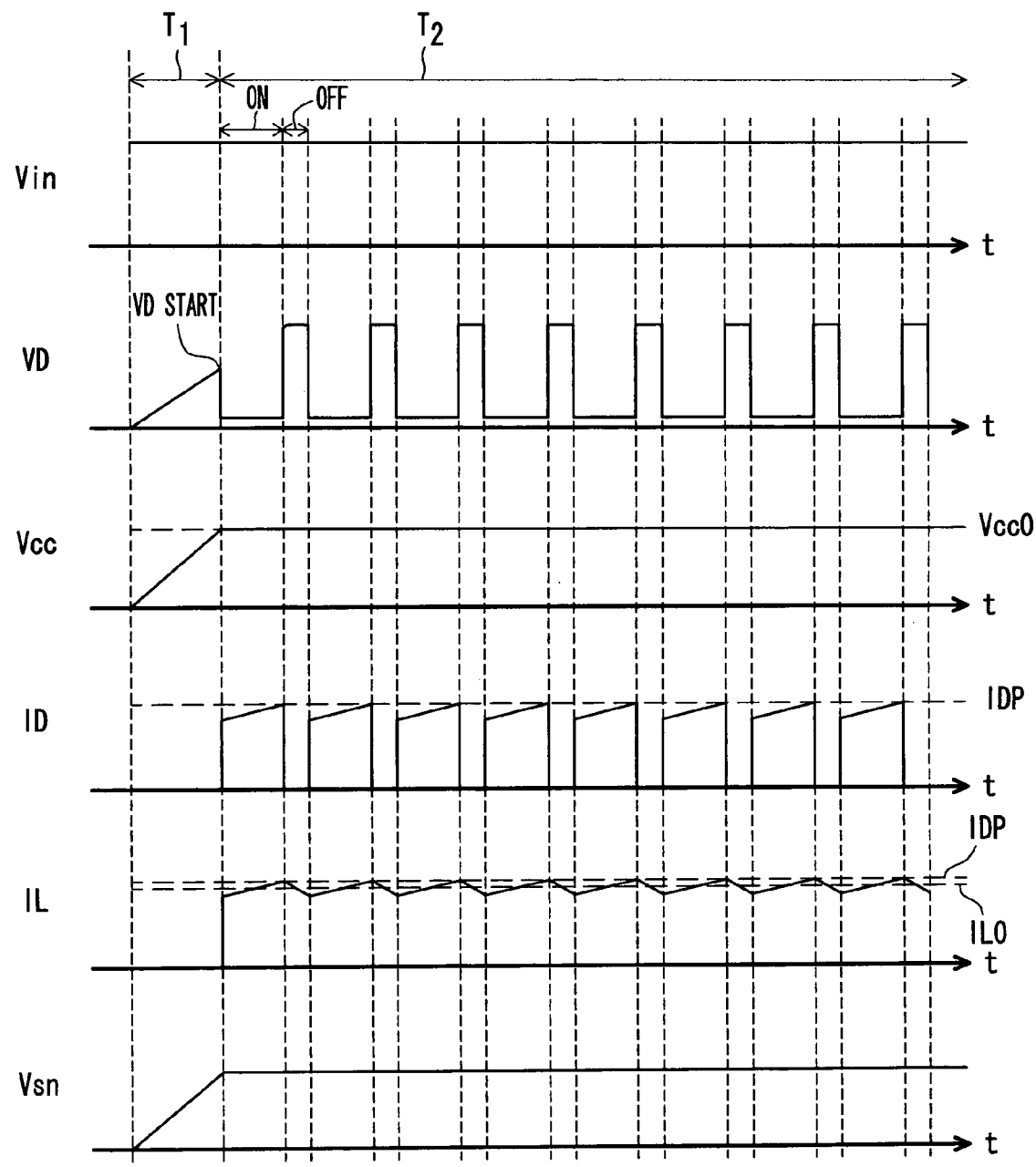
FIG. 2 is a waveform diagram of voltage and current of the LED driving apparatus of the embodiment 1 of the present invention.

With reference to FIG. 2 and FIG. 3, the operation of the LED driving apparatus according to the embodiment 1 of the present invention is described. FIG. 2 shows a waveform of DC voltage Vin, a waveform of voltage VD of the DRAIN terminal 7, a waveform of the voltage Vcc of the VCC terminal 14, a waveform of the DRAIN current ID, a waveform of the choke coil current IL (that is, it is a waveform of current flowing through the light-emitting diode 6), and a waveform of the detection reference voltage Vsn in the case that the LED driving apparatus of the embodiment 1 operates.

FIG. 3 shows the relation between the voltage VD on the high potential side of the junction-type FET 8 and the voltage VJ on the low potential side of the junction-type FET 8. In FIG. 3, the voltage VDSTART is the voltage VD (of the DRAIN terminal 7) on the high voltage side of the junction-type FET 8 at the time when the control circuit 9 starts the intermittent ON/OFF control of the switching device 9.

In FIG. 2, the DC voltage Vin is obtained by an AC power source 1, a rectification circuit 2, and a smoothing capacitor 3. The DC voltage Vin is applied to the high potential side of the junction-type FET 8 of the switching device block 111 through the choke coil 4 and the light-emitting diode 6.

As shown in the first period $T_1$ of FIG. 2, when the DC voltage Vin is applied to the junction-type FET 8, the voltage VD on the high potential side of the junction-type FET 8 rises gradually. As shown in FIG. 3, the voltage VJ on the low potential side of the junction-type FET 8 rises with the rise of voltage VD on the high potential side (Range A). When the voltage VD on the high potential side rises further and becomes higher than a predetermined voltage VDP, by the pinch off, the voltage VJ on the low potential side becomes a constant voltage value VJP (Range B).

As shown in the first period T1 of FIG. 2, by the regulator 12 connected to the low potential side of the junction-type FET 8, the voltage Vcc of the VCC terminal 14 of the control circuit 112 rises. When the voltage Vcc of the VCC terminal 14 reaches the start voltage Vcc0 of the start/stop circuit 114 (at this time, the voltage is VD=VDSTART on the high potential side of the junction-type FET 8.), the start/stop circuit 114 outputs the start-signal and the control circuit 112 starts the intermittent ON/OFF control of the switching device 9 (for second period $T_2$ of FIG. 2).

The regulator 12 controls the voltage Vcc of VCC terminal 14 so as to become a constant voltage Vcc0. The control circuit 112 stops when the voltage Vcc of the VCC terminal 14 falls below the stop voltage of the start/stop circuit 114.

The oscillation frequency of the switching device 9 and MAX on duty are determined respectively by the CLOCK signal and the MAXDUTY signal of the oscillator 17. The current flowing through the switching device 9 is detected by comparing the ON voltage of the switching device 9 with the detection reference voltage Vsn of the drain current detection circuit 113.

After the switching device 9 turns on and the ON voltage of the switching device 9 reaches Vsn, the switching device 9 is turned to the OFF state until the next CLOCK signal of the oscillator 17 is inputted to the set terminal of the RS flip flop 18. That is, the on duty of the switching device 9 is determined by the output signal of the OR circuit 20 to which the inverse signal of the MAXDUTY signal of oscillator 17 and the output signal of the drain current detection circuit 113 are inputted.

As described above, the control circuit 112 controls ON/OFF of the switching device 9 intermittently, and the current ID flowing through the switching device 9 becomes as shown in FIG. 2.

When the switching device 9 is ON state, the current ID of which peak is IDP flows in the direction of the choke coil 4 to the light-emitting diode 6 and to the switching device 9. The current flowing through the choke coil 4 (that is, the current flowing through the light-emitting diode 6) becomes the waveform of the current IL of FIG. 2. When the switching device 9 is ON state, the current IL is equal to the current ID.

When the switching device 9 is OFF state, the current IL flows through a closed-loop of the choke coil 4 to the light-emitting diode 6 and to diode 5. Therefore, the average current of the current flowing through the light-emitting diode 6 becomes IL0 of FIG. 2.

The LED driving semiconductor circuit of the present invention which is composed as described above and the LED driving apparatus including the above-mentioned semiconductor circuit have the following effects (1) to (4).

(1) In the present invention, since the resistor is unnecessary, there is no power loss at the start time. In general, the conventional LED driving semiconductor circuit is supplied with a power from the input voltage (which is a high voltage) through a resistor in such the DC current. Since this power supply is done not only at the time of start or stop, but also during the ordinary operation by the same manner, the power loss is generated by the resistor. However, according to the composition of the embodiment 1 of the present invention, because any above-mentioned resistor is unnecessary, there is no power loss.

(2) According to the present invention, since the drain current detection circuit 113 detects the current ID flowing through the switching device 9 by detecting the ON voltage of the switching device 9, the resistor for detecting the current, which was necessary in the prior art, becomes unnecessary. According to the present invention, the power loss caused by the resistor for detecting the current does not generate.

(3) The present invention is, using of the junction-type FET 8, usable from low voltage to high voltage as for the input power source. According to the present invention, stable light-emission brightness can be obtained by the small-sized LED driving semiconductor circuit which includes a small number of parts and the LED driving apparatus including the LED driving semiconductor circuit.

(4) In the present invention, it is possible to preset the light-emission brightness of the light-emitting diode by changing the detection reference voltage Vsn of the drain current detection circuit.

Hereupon, in FIG. 1, the switching device block 111, the control circuit 112, the drain current detection circuit 113 and the start/stop circuit 114 may be formed on a same substrate of the LED driving semiconductor circuit 101. Hereby, a further small-sizing of the LED driving apparatus can be realized. This is the same also in the embodiments to be described below.

Figure 4A:
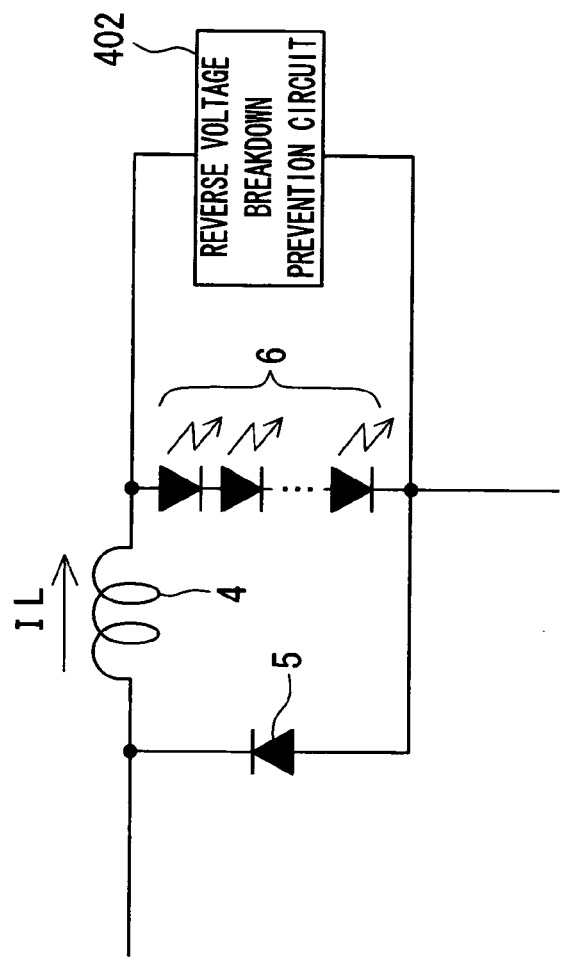
FIG. 4A and FIG. 4B is a drawing in which a reverse voltage breakdown prevention circuit is added to the light-emitting diode block of the present invention.
Figure 4B:
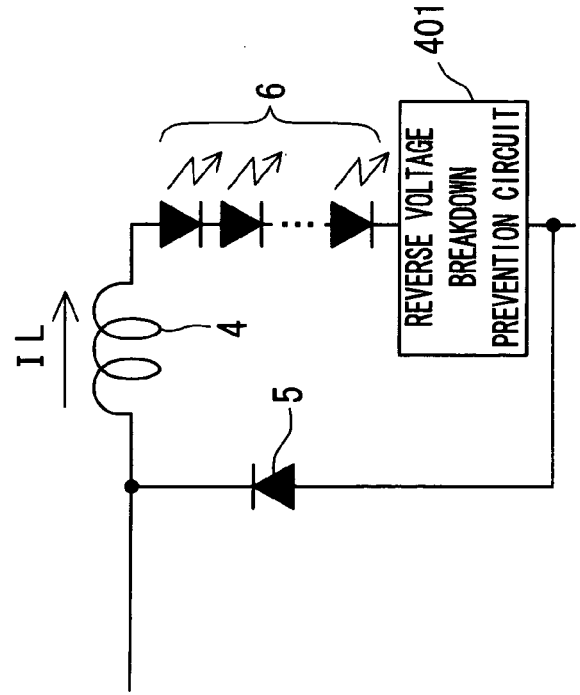

In addition, as shown in FIG. 4A and FIG. 4B, a reverse-voltage breaking prevention circuit 401 may be connected to the light-emitting diode 6 in series or a reverse-voltage breaking prevention circuit 402 may be connected to the light-emitting diode 6 in parallel. Hereby, it is possible to prevent that the light-emitting diode 6 is broken when the reverse voltage is applied.

In the transient state in which the switching device 9 switches over from OFF state to ON state, when the reverse recovery time (Trr) of the diode 5 is slow, the power loss becomes large. Therefore, the reverse recovery time (Trr) of the diode 5 of the embodiment 1 of the present invention is less than or equal to 100 nsec.

<<Embodiment 2>>

Figure 5:
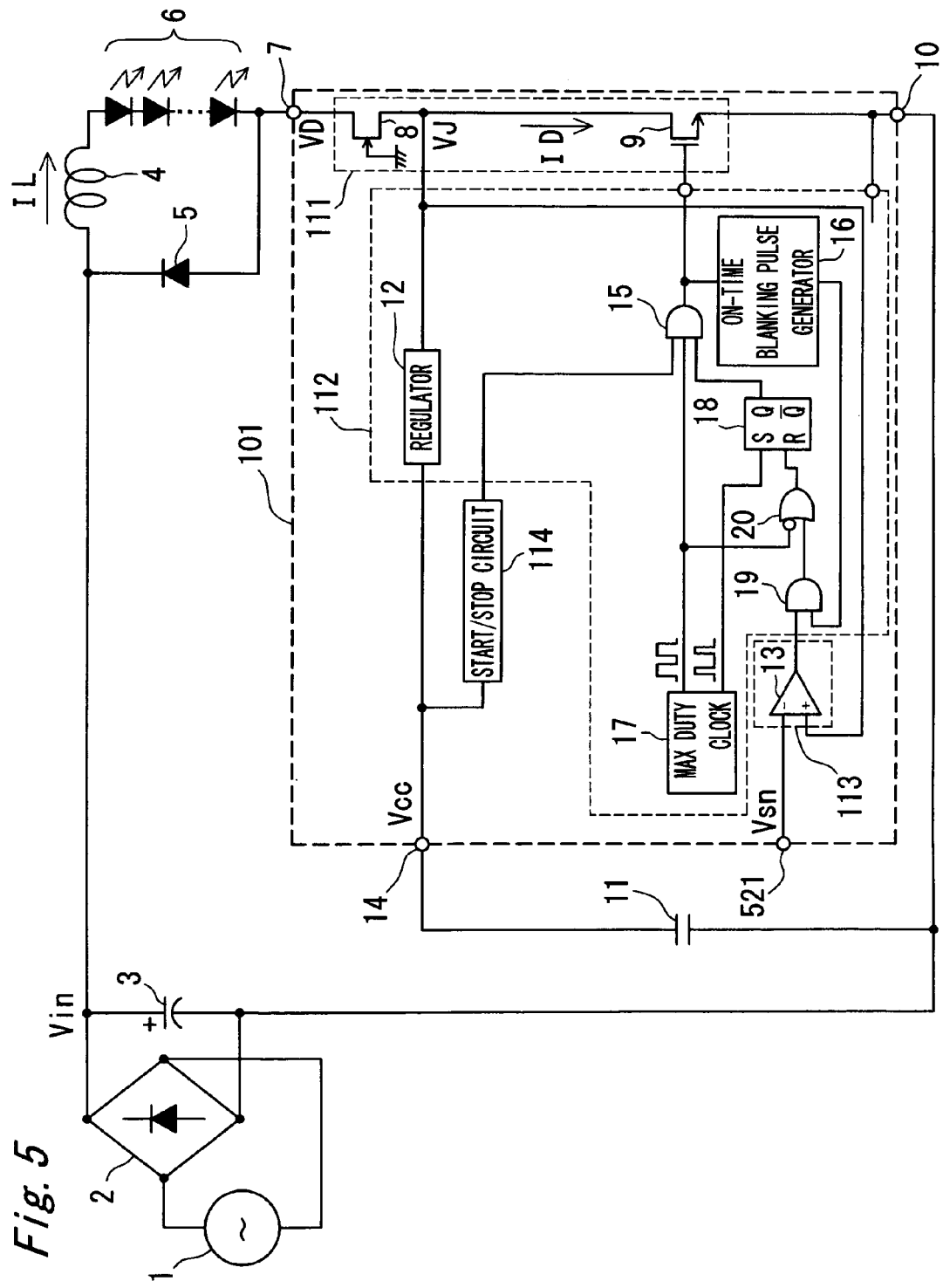
FIG. 5 is a circuit diagram of a LED driving apparatus of an embodiment 2 of the present invention.
Figure 6:
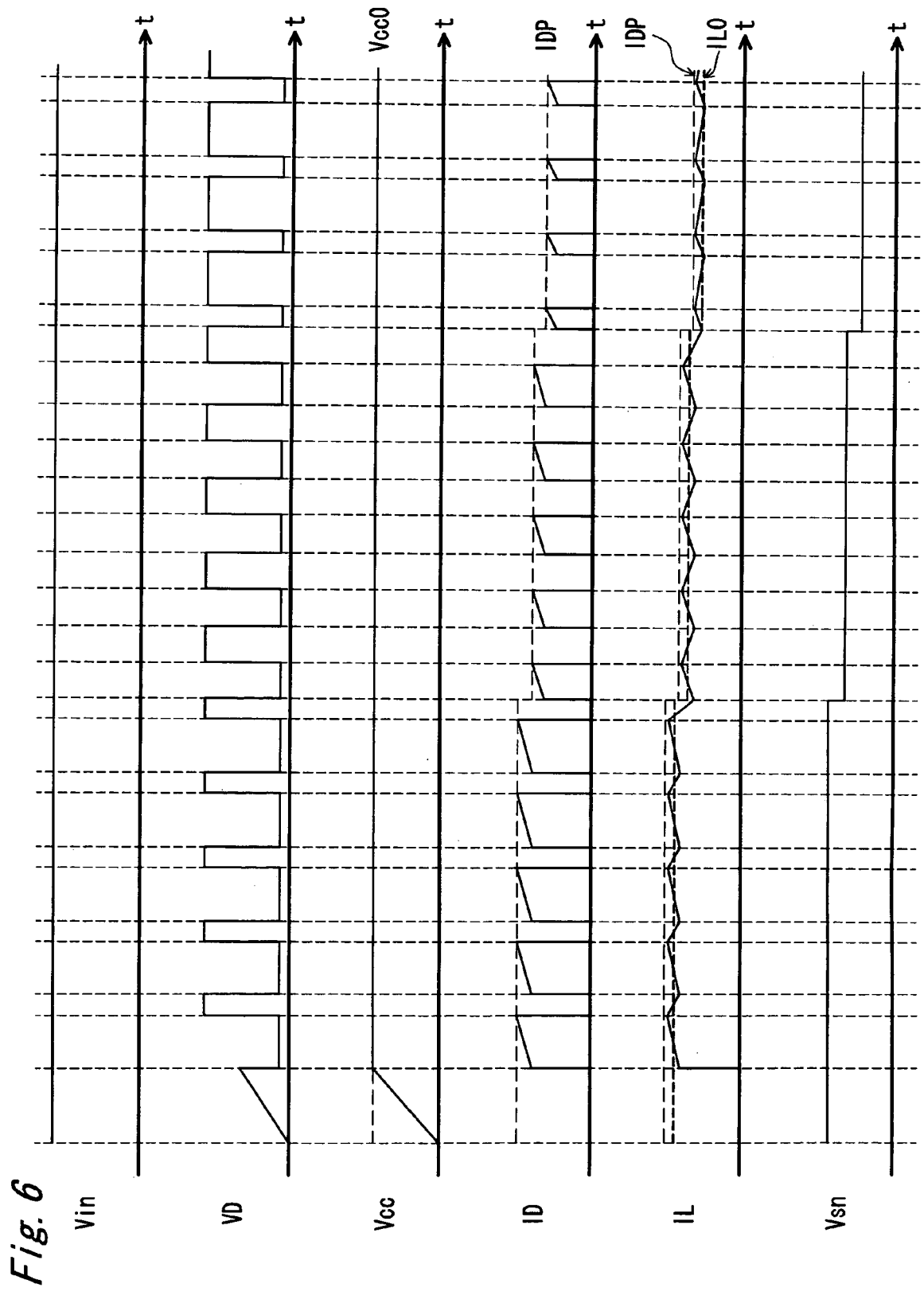
FIG. 6 is a waveform diagram of voltage and current of the LED driving apparatus of the embodiment 2 of the present invention.

With reference to FIG. 5 and FIG. 6, a LED driving semiconductor circuit and a LED driving apparatus including the same of the embodiment 2 of the present invention will be described below. FIG. 5 is a circuit diagram showing the LED driving apparatus of the embodiment 2 of the present invention.

In the LED driving apparatus according to the embodiment 2 of the present invention shown in FIG. 5, a terminal SN on which the detection reference voltage Vsn of a drain current detection circuit 113 is determined, is an external terminal 521 (third input terminal). For those other than that, the circuit configuration of the LED driving apparatus of the embodiment 2 is basically the same as that of the embodiment 1 shown in FIG. 1.

With reference to FIG. 6, the operation of the LED driving apparatus of the embodiment 2 of the present invention is described. FIG. 6 shows a waveform of the DC voltage Vin, a waveform of the voltage VD of the DRAIN terminal 7, a waveform of the voltage Vcc of the VCC terminal 14, a waveform of the DRAIN current ID, a waveform of the choke coil current IL (that is, a waveform of current flowing through the light-emitting diode 6), and a waveform of the voltage Vsn of a detection reference-terminal 521 when the LED driving apparatus of the embodiment 2 is used.

Since the start and stop of the LED driving apparatus of the embodiment 2 of the present invention is the same as that of the LED driving apparatus of the first embodiment of the present invention, explanations overlapping to each other are omitted.

The detection reference voltage Vsn of the drain current detection circuit 113 of the embodiment 2 is variable with the voltage inputted to the external terminal SN 521. For example, as shown in FIG. 6, when gradually lowering the voltage Vsn to be inputted to the external terminal SN 521 in three steps, the level of the DRAIN current detected by the drain current detection circuit 113 also declines gradually in three steps, accordingly the current ID flowing through the switching device 9 declines gradually also in three steps. As a result, a current PWM controlled flows through the switching device 9 as shown by the ID of FIG. 6.

The current IL flowing through the choke coil 4 (that is, the current flowing through the light-emitting diode 6) becomes as shown in FIG. 6, hence the average current IL0 of the light-emitting diode 6 declines in three steps as shown in FIG. 6. As has been described, the average current of the light-emitting diode 6 changes based on the Vsn voltage inputted to the external terminal SN 521, therefore, it becomes possible that the LED driving apparatus of the embodiment 2 is able to dim the light-emitting diode 6.

Furthermore, the drain current detection circuit 113 of the embodiment 2 works so that the average current of the light-emitting diode 6 changes in proportion with respect to the change of the detection reference voltage Vsn. In place of the above, the drain current detection circuit 113 may work so that the average current of the light-emitting diode 6 changes in inversely proportional with respect to the change of the detection reference voltage Vsn. It is also similar in the embodiment hereinafter.

The LED driving semiconductor circuits of the embodiment 2 of the present invention and the LED driving apparatus including the same have the following effects in addition to the effects shown in the first embodiment of the present invention. The LED driving semiconductor circuit of the embodiment 2 of the present invention and the LED driving apparatus including the same can easily adjust the light brightness of the light-emitting diode 6 from the outside by the external terminal SN 521 which determines the detection reference voltage of the drain current detection circuit. That is, the LED driving semiconductor circuit of the embodiment 2 of the present invention and the LED driving apparatus including the same have a dimming function.

<<Embodiment 3>>

Figure 7:
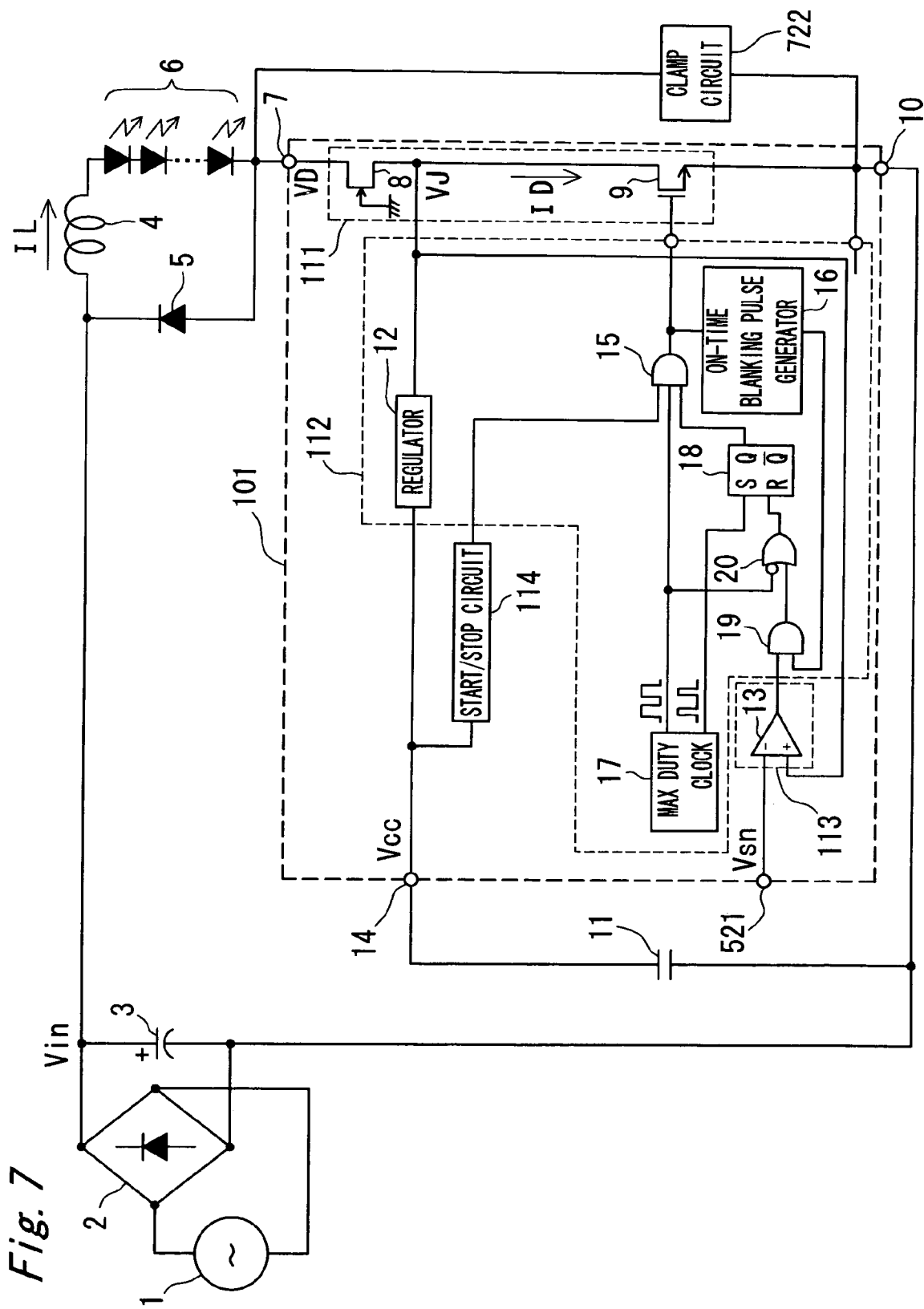
FIG. 7 is a circuit diagram of a LED driving apparatus of an embodiment 3 of the present invention.
Figure 8:
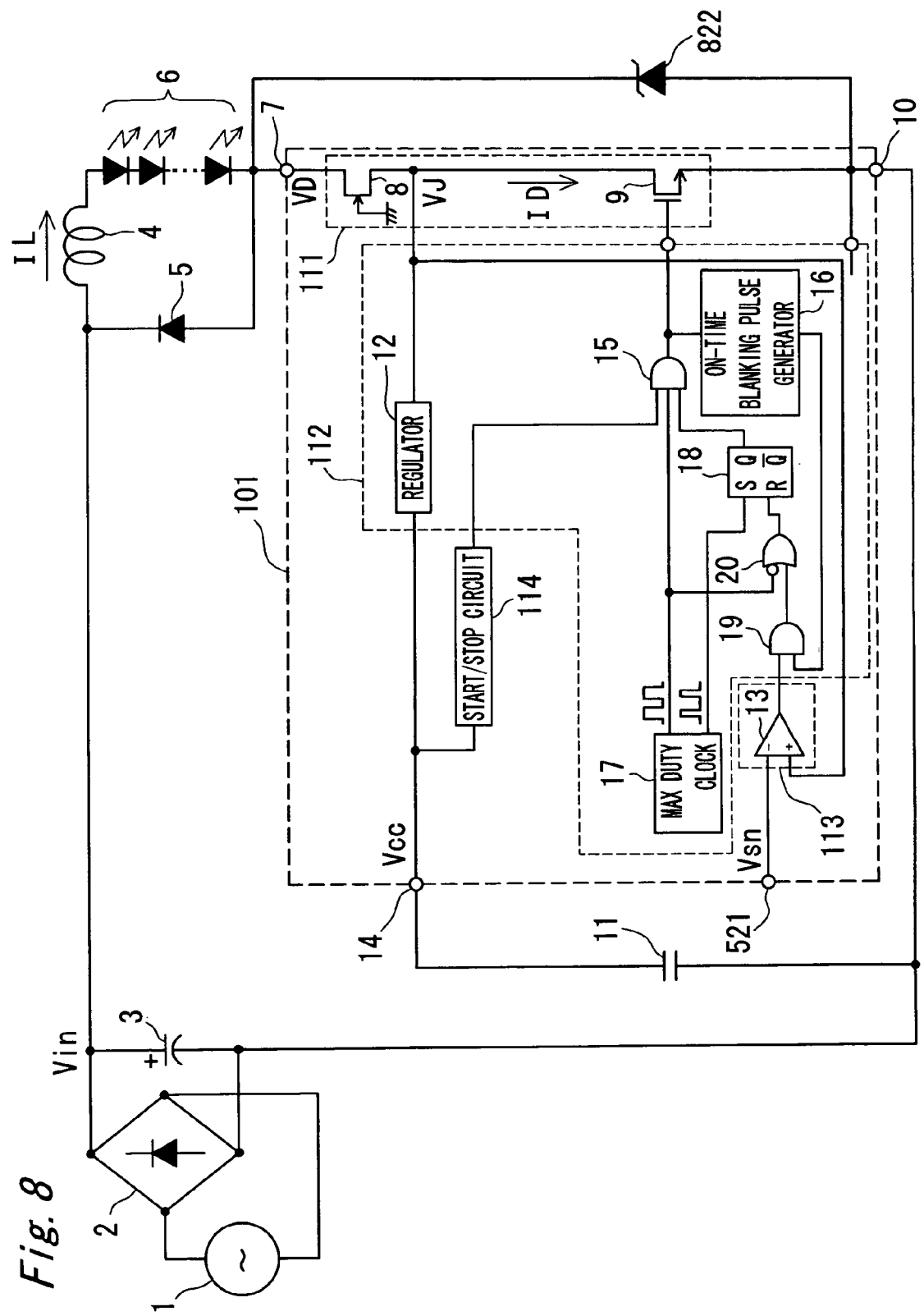
FIG. 8 is a circuit diagram showing a realistic example of a clamp circuit of the embodiment 3 of the present invention.

With reference to FIG. 7 and FIG. 8, a LED driving semiconductor circuit and a LED driving apparatus including the same of the embodiment 3 of the present invention will be described below. FIG. 7 is a circuit diagram showing the LED driving apparatus of the embodiment 3 of the present invention.

In the LED driving apparatus of the embodiment 3 of the present invention, a clamp circuit 722 is connected in parallel to the switching device block 111 of the embodiment 2. For those other than that, the LED driving apparatus of the embodiment 3 of the present invention is basically the same as the embodiment 2 of the present invention shown in FIG. 5 in its circuit configuration and operations.

When the switching device 9 switches over from ON state to OFF state, due to the ringing caused by the wiring capacitance and/or the wiring inductance, the voltage VD of the high potential side of the switching device block 111 sometimes may reach voltages exceeding the withstand voltage of the switching device 9. This may cause a breakdown of the switching device 9.

In the LED driving apparatus of the embodiment 3, a clamp circuit 722 having a clamping voltage which is lower than the withstand voltage of the switching device 9 is connected to the switching device block 111 in parallel. A one end of the clamp circuit 722 is connected between the light-emitting diode 6 and the DRAIN terminal 7 and the other end is connected to the GND/SOURCE terminal 10. In the embodiment 3, the clamp circuit 722 is attached externally to the LED driving semiconductor circuit 101. The clamp circuit 722 clamps the voltage VD on the higher potential side of the switching device block 111 by this clamping voltage and prevents the breakdown of the switching device 9.

FIG. 8 is a circuit diagram showing the LED driving apparatus when using a zener diode 822 as the clamp circuit 722. For example, a zener diode 822 is used for the clamp circuit 722 of the embodiment 3 as shown in FIG. 8. A cathode terminal of the zener diode 822 is connected to the DRAIN terminal 7 and an anode terminal is connected to the GND/SOURCE terminal 10.

The LED driving semiconductor circuit of the embodiment 3 of the present invention and the LED driving apparatus including the same further have the following effects in addition to the effects which were shown in the embodiments 1 and 2 of the present invention. In the LED driving apparatus of the embodiment 3 of the present invention, while the control circuit 112 controls ON/OFF of the switching device 9 intermittently, it is possible to clamp a jump of the voltage VD on the higher potential side of the switching device block 111 that is caused by the wiring capacitance and/or the wiring inductance to a voltage equal or lower than the withstand voltage of the switching device 9. By preventing the breakdown of the switching device 9, an LED driving apparatus having a high safety can be realized.

In the following embodiments similarly, it is possible to obtain the effect of preventing the breakdown of the switching device 9 by adding the clamp circuit 722.

<<Embodiment 4>>

Figure 9:
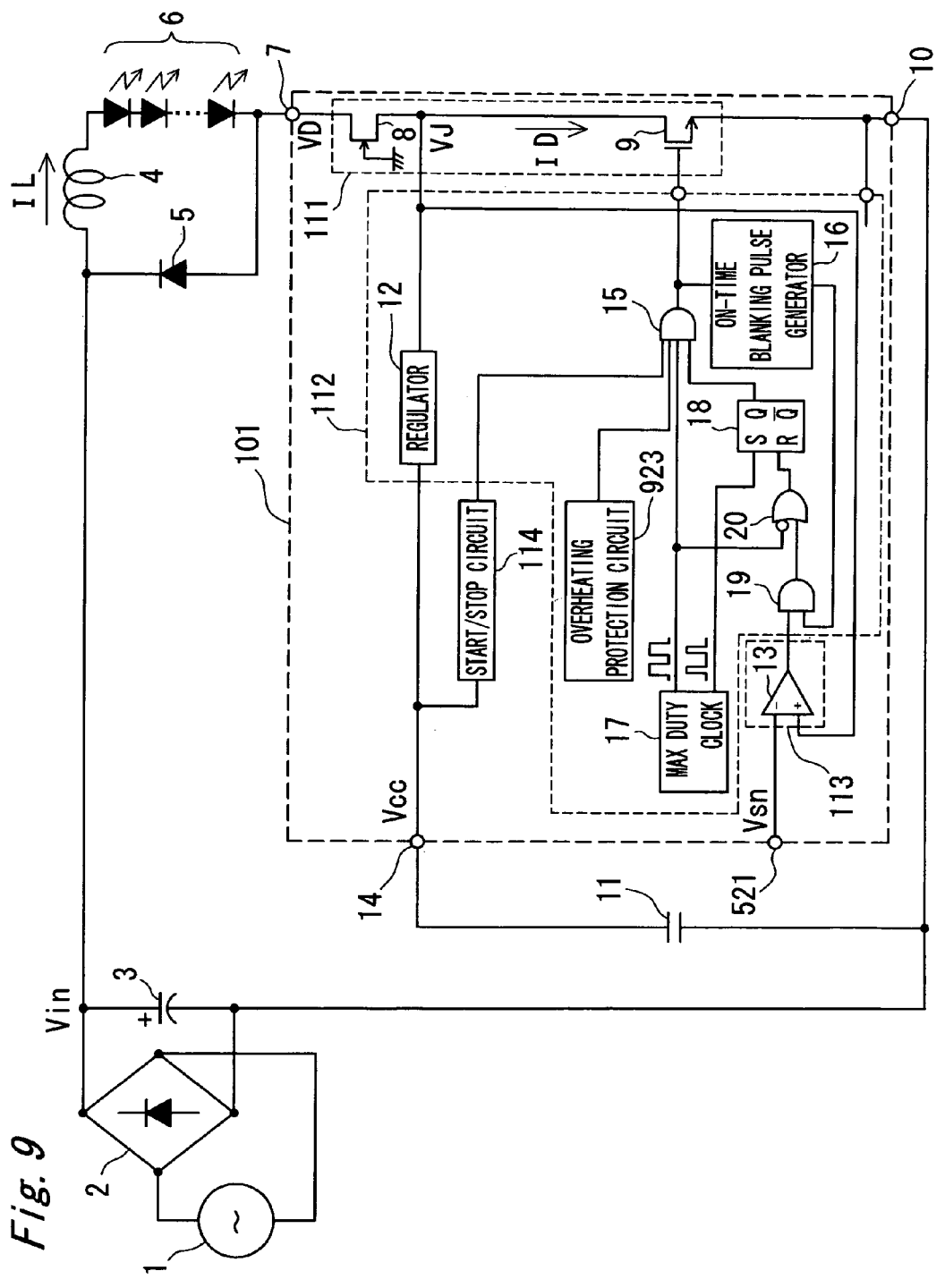

With reference to FIG. 9, a LED driving semiconductor circuit and a LED driving apparatus including the same of the embodiment 4 of the present invention will be described below. FIG. 9 is a circuit diagram showing the LED driving apparatus of the embodiment 4 of the present invention.

The LED driving semiconductor circuit 101 of the LED driving apparatus of the embodiment 4 of the present invention has a configuration that is added with an overheating protection circuit 923 to the LED driving semiconductor circuit 101 of the embodiment 2 of FIG. 5. For those other than that, the LED driving semiconductor circuit of the embodiment 4 of the present invention and the LED driving apparatus including the same are basically the same as the embodiment 2 in their circuit configuration and the operation.

The overheating protection circuit 923 detects the temperature of the switching device 9. Specifically, when the switching device block 111 having the switching device 9 and the control circuit 112 having the overheating protection circuit 923 are formed on the same substrate of the LED driving semiconductor circuit 101, the temperature detection accuracy of the overheating protection circuit 923 becomes high.

When the overheating protection circuit 923 detects an extraordinary temperature rise of the switching device 9, it outputs the signal to turn the switching device 9 off compulsorily. The AND circuit 15 inputs this off signal and turns the switching device 9 off compulsorily. Hereby, temperature of the switching device 9 can be lowered.

There are following two ways for releasing from the compulsory OFF state of the switching device 9:

(1) A latch mode in which the power supply to the LED driving apparatus is stopped once and this OFF state is maintained until the power supply is started again.

(2) The self reset mode in which the switching device 9 is held in the OFF state until its temperature becomes lower than the temperature prescribed by the overheating protection circuit 923, and when its temperature becomes lower than this prescribed temperature, the OFF state is automatically released.

The LED driving semiconductor circuit of the embodiment 4 of the present invention and the LED driving apparatus including the same further have the following effect in addition to the effects shown in the embodiment 2 of the present invention. According to the LED driving semiconductor circuit of the embodiment 4 of the present invention, since the breakdown of the switching device 9 caused by extraordinary temperature rise can be avoided, an LED driving apparatus having a further higher safety can be realized.

Also in the following embodiments, the effect of avoiding the breakdown of the switching device 9 caused by the extraordinary temperature rise can be obtained by adding the overheating protection circuit 923.

<<Embodiment 5>>

Figure 10:
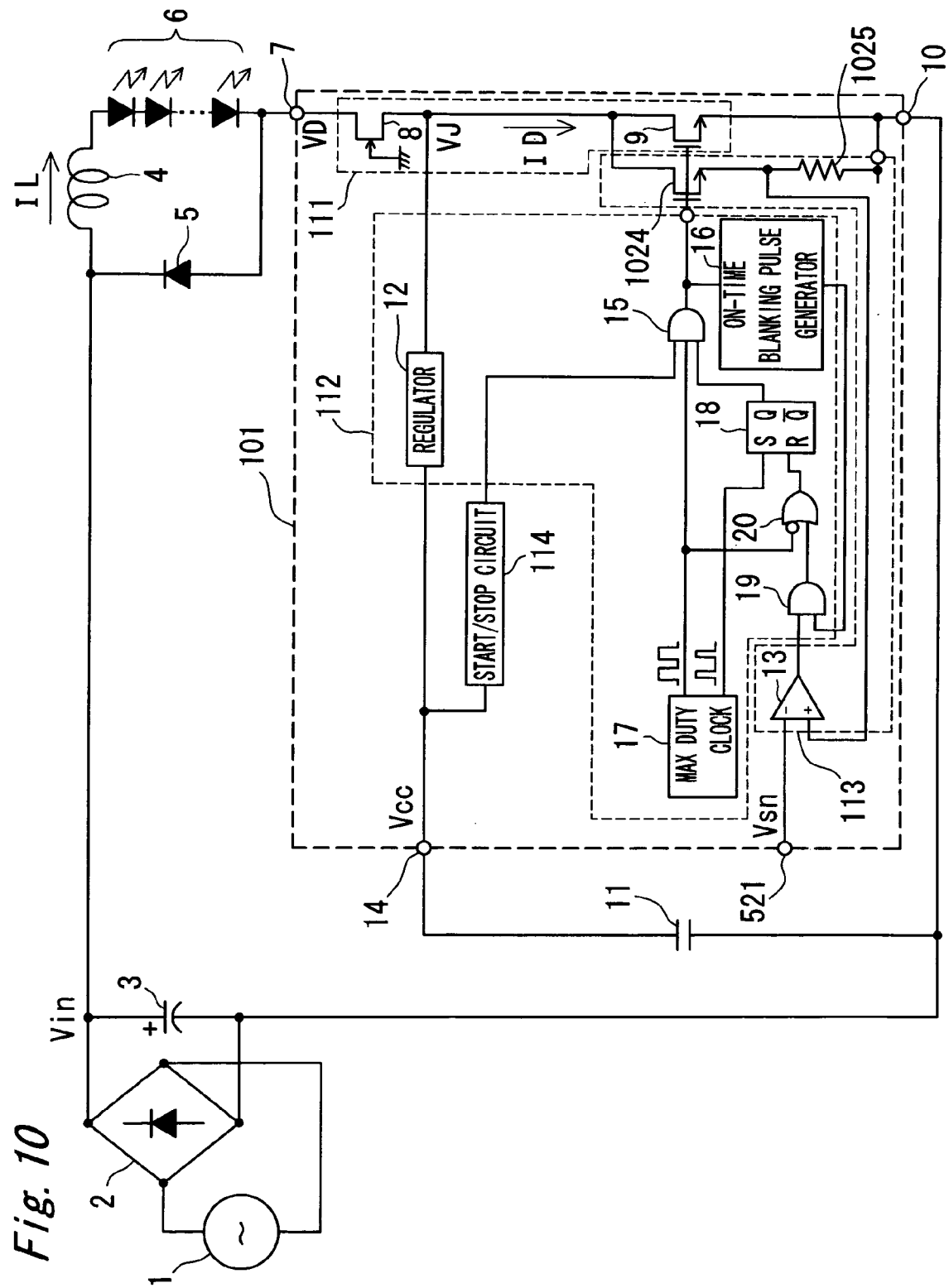
FIG. 10 is a circuit diagram of a LED driving apparatus of an embodiment 5 of the present invention.

With reference to FIG. 10, a LED driving semiconductor circuit and a LED driving apparatus including the same of the embodiment 5 of the present invention will described below. FIG. 10 is a circuit diagram showing the LED driving apparatus of the embodiment 5 of the present invention.

The semiconductor circuit of the LED driving apparatus of the embodiment 5 of the present invention is different from the embodiment 2 shown in FIG. 5 in its configuration of the drain current detection circuit 113. For those other than that, the LED driving semiconductor circuit of the embodiment 5 of the present invention and the LED driving apparatus including the same are basically the same as the embodiment 2 in their circuit configuration and the operations.

The drain current detection circuit 113 of the embodiment 5 of the present invention has a switching device 1024 (second switching device) and a resistor 1025 in addition to the comparator 13. The switching device 1024 is connected in parallel to the switching device 9, one end is connected to the low potential side of the junction-type FET 8 and the other end is connected to the resistor 1025. The switching device 1024 has a small constant current ratio to the switching device 9. Through the switching device 1024, current of a constant current ratio, which is smaller than that of the current flowing through the switching device 9, flows.

The resistor 1025 is connected in series to the switching device 1024 between the switching device 1024 and the GND/SOURCE terminal 10. The connecting point of the switching device 1024 and the resistor 1025 is connected to the positive terminal of the comparator 13.

The drain current detection circuit 113 of the embodiment 2 detects the ON voltage of the switching device 9. Consequently, after the switching device 9 switches over from OFF state to ON state, the drain current detection circuit 113 of the embodiment 2 can not detect the drain current correctly for a certain time period (in general, hundreds nsec). Therefore, by preparing a ON-time blanking pulse generator 16, a time period in which the drain current is not detected is provided.

In contrast to this, the drain current detection circuit 113 of the embodiment 5 detects the current ID flowing through the switching device 9 by detecting a voltage across the resistor 1025 and inputs it to the comparator 13. Therefore, since the drain current detection circuit 113 of the embodiment 5 of the present invention compares a voltage determined by [the current flowing through the resistor 1025×its resistance value] with the detection reference voltage Vsn, time period in which the drain current cannot be detected correctly as it occurred in the embodiment 2, is not generated.

Moreover, the LED driving semiconductor circuit of the embodiment 5 of the present invention and the LED driving apparatus including the same have the following effects in addition to the effect shown in the embodiment 2 of the present invention. The LED driving semiconductor circuit of the embodiment 5 of the present invention and the LED driving apparatus including the same can detect the drain current ID correctly even when the switching device 9 switches over from OFF state to ON state.

Hereupon, at the moment the switching device 9 switched over from OFF state to ON state, a transitional current flows due to the capacitance C of the switching device itself and the capacitance C and/or the inductance L due to the wiring length. Therefore, the LED driving semiconductor circuit of the embodiment 5 of the present invention and the LED driving apparatus including the same have the ON-time blanking pulse for controlling the switching device to turn on or off stably.

<<Embodiment 6>>

Figure 11:
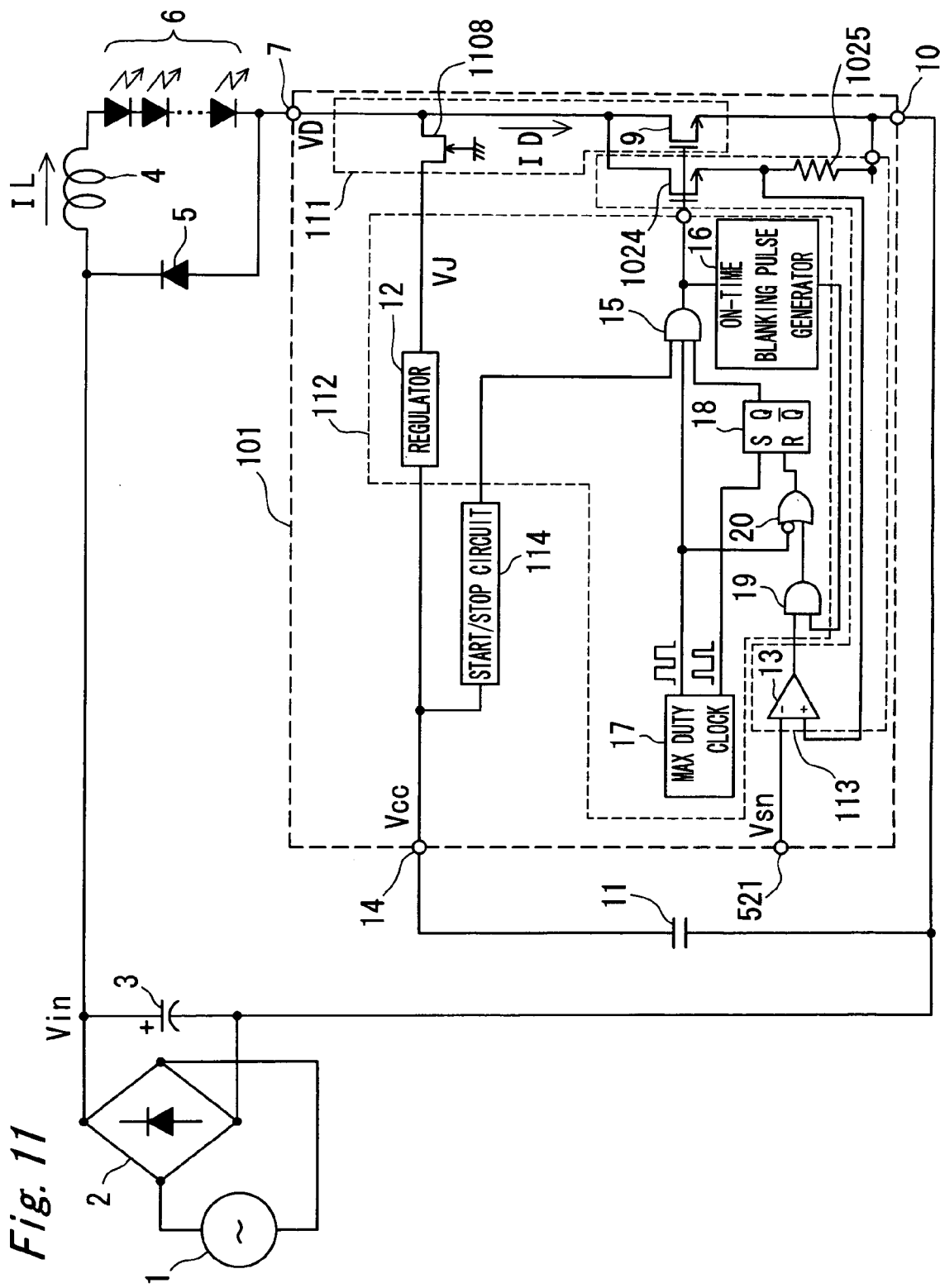
FIG. 11 is a circuit diagram of a LED driving apparatus of an embodiment 6 of the present invention.

With reference to FIG. 11, a LED driving semiconductor circuit and a LED driving apparatus including the same of the embodiment 6 of the present invention will be described. FIG. 11 is a circuit diagram showing the LED driving apparatus of the embodiment 6 of the present invention.

In the LED driving semiconductor circuit 101 included in the apparatus of the embodiment 6 of the present invention, connection of a junction-type FET 1108 of the switching device block 111 is different from that of the embodiment 5 shown in FIG. 10. For those other than that, the LED driving semiconductor circuit of the embodiment 6 of the present invention and the LED driving apparatus including the same are basically the same as those of the embodiment 5 in their circuit configuration and operation.

In the switching device block 111 of the embodiments 1 to 5, the junction-type FET 8 and the switching device 9 is connected in series. The switching device block 111 of the embodiments 1 to 5 is suitable for the case that it is composed in a single package by unifying the junction-type FET 8 and the switching device 9.

In the switching device block 111 of the embodiment 6 of the present invention, the one end of the junction-type FET 1108 is connected to the connecting point of the DRAIN terminal 7 and the switching device 9 and the other end is connected to the regulator 12. The switching device 9 is connected between the DRAIN terminal 7 and the GND/SOURCE terminal 10. This configuration is suitable when the junction-type FET 1108 and the switching device 9 are composed in respective separated packages.

The LED driving semiconductor circuit of the embodiment 6 of the present invention and the LED driving apparatus including the same have the effect that is identical with the embodiment 5.

<<Embodiment 7>>

Figure 12:
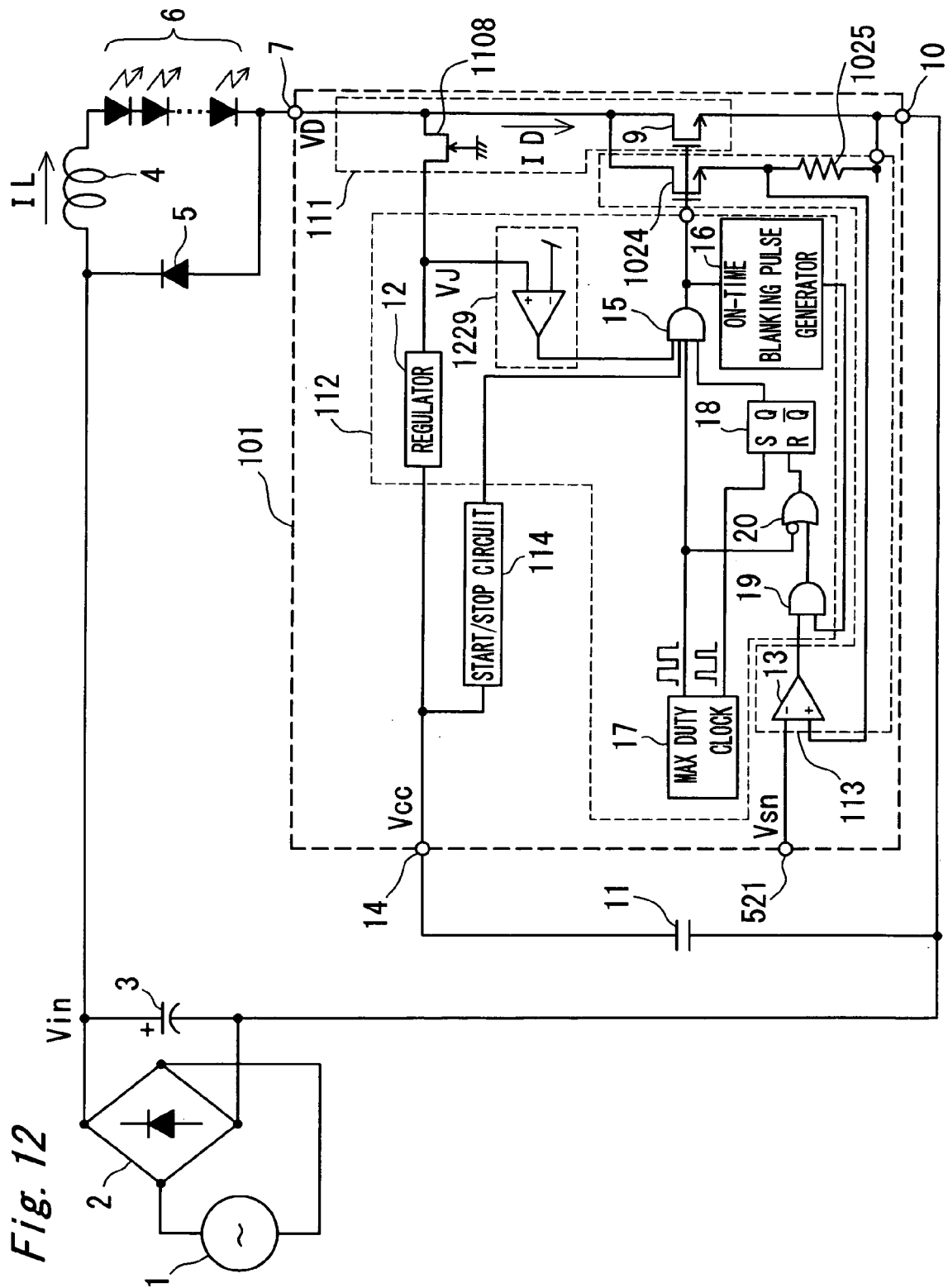
FIG. 12 is a circuit diagram of a LED driving apparatus of an embodiment 7 of the present invention.

With reference to FIG. 12, a LED driving semiconductor circuit and a LED driving apparatus including the same of the embodiment 7 of the present invention will be described. FIG. 12 is a circuit diagram showing the LED driving apparatus of the embodiment 7 of the present invention.

In the LED driving semiconductor circuit included in the LED driving apparatus of the embodiment 7 of the present invention, an input voltage detection circuit 1229 is added to the configuration of the embodiment 6 shown in FIG. 11. For those other than that, the LED driving semiconductor circuit and the LED driving apparatus of the embodiment 7 of the present invention is basically the same as those of the embodiment 6 in their circuit configuration and operation.

The voltage VD of the high potential side of a junction-type FET 1108 of the embodiment 7 of the present invention and the voltage VJ on the low potential side are in a relation shown in FIG. 3. As described in the first embodiment, this relation can be divided largely into two regions of a range A and a range B.

The voltage VDSTART of FIG. 3 is the voltage VD on the high potential side of the junction-type FET 1108 when the control circuit 112 starts the intermittent ON/OFF control of the switching device 9. In FIG. 3, although the start-up voltage VDSTART is in the range A, depending on the facture of the junction-type FET 8(1108), dispersion in values of the start-up voltage VDSTART occurs. Therefore, in the LED driving apparatus of the embodiment 6 shown in FIG. 11, using the external part for detecting the input voltage, it is possible to detect an input voltage to a certain extent, but the input voltage detection with a high accuracy cannot be attained.

In the LED driving apparatus of the embodiment 7, an input voltage detection circuit 1229 is connected between the low potential side of the junction-type FET 1108 and the AND circuit 15. In the embodiment 7, the input voltage detection circuit 1229 is included in the control circuit 112. The input voltage detection circuit 1229 outputs the signal of High when the voltage VJ on the low potential side of the junction-type FET 1108 is equal to or higher than a predetermined value and outputs the Low when the voltage VJ is lower than a predetermined value. By inputting the output signal of the input voltage detection circuit 1229 to the AND circuit 15, the dispersion of the start-up voltage VDSTART of the ON/OFF control can be reduced.

The LED driving semiconductor circuit of the embodiment 7 of the present invention and the LED driving apparatus including the same further have the following effect in addition to the effects shown in the embodiment 6 of the present invention.

(1) Since the external part for detecting the input voltage is unnecessary, a small-sized and highly functional LED driving semiconductor circuit and a LED driving apparatus including the same can be realized.

(2) Since the accuracy of detecting an input voltage is high and the resistor is unnecessary to detect the input voltage, there is not a power loss by the resistance.

<<Embodiment 8>>

Figure 13:
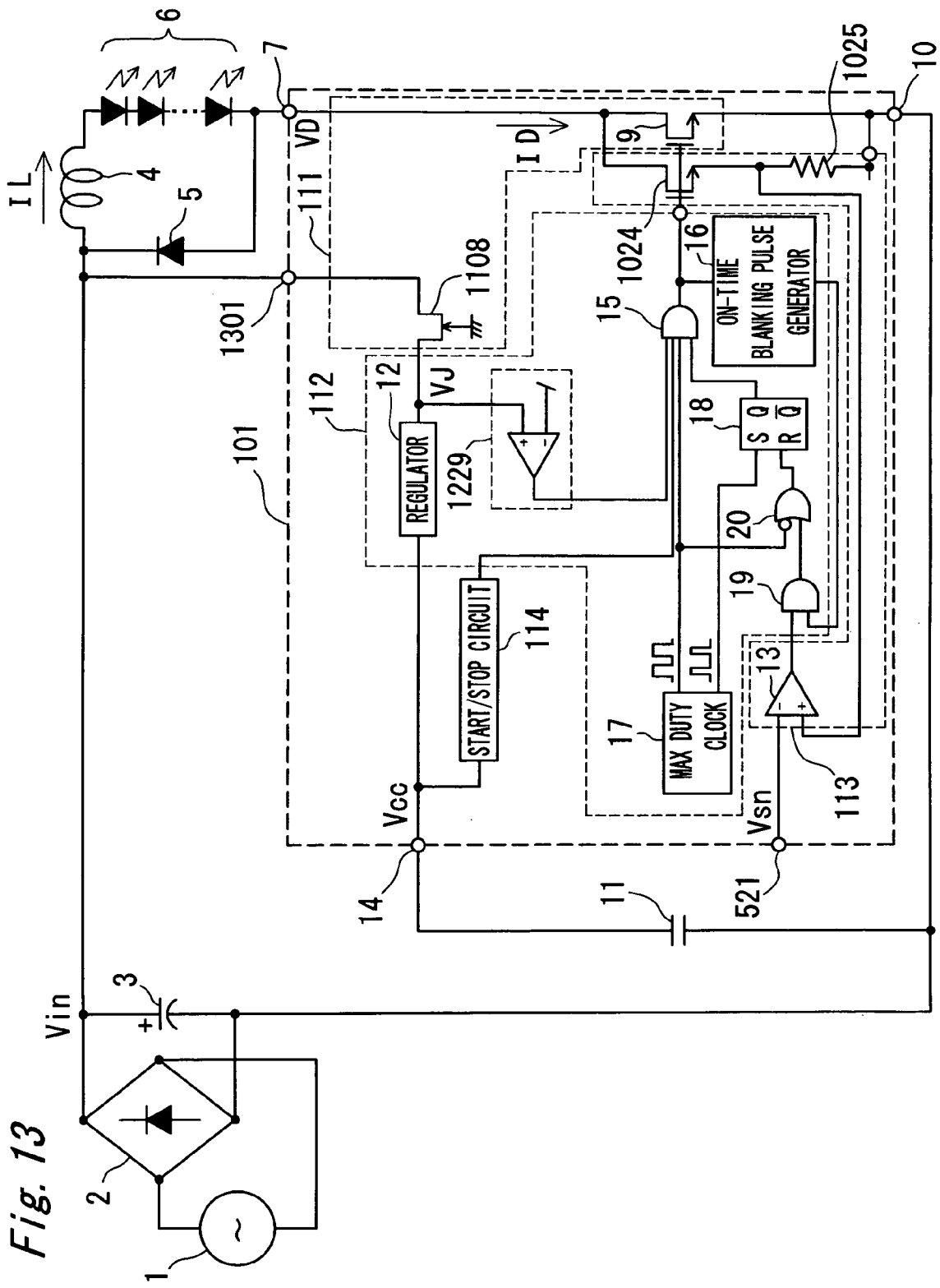
FIG. 13 is a circuit diagram of a LED driving apparatus of an embodiment 8 of the present invention.

With reference to FIG. 13, a LED driving semiconductor circuit and a LED driving apparatus including the same of the embodiment 8 of the present invention will be described. FIG. 13 is a circuit diagram showing the LED driving apparatus of the embodiment 8 of the present invention.

The LED driving semiconductor circuit included in the apparatus of the embodiment 8 of the present invention is connected to a connecting point of the smoothing capacitor 3 and the choke coil 4 and has an IN terminal (second input terminal) 1301 through which the DC voltage Vin is inputted.

The high potential side of the junction-type FET 1108 of the switching device block 111 is connected to the IN terminal 1301 and the low potential side is connected to the regulator 12. For those other than that, the LED driving semiconductor circuit of the embodiment 8 of the present invention and the apparatus including the same are basically the same as the embodiment 7 in their configuration and operation.

In the embodiments 1 to 7, while stopping the operation of the switching device 9 (holding the OFF state), the LED driving semiconductor circuit 101 is supplied with the power through a path from the DC power supply Vin to coil 4, to light-emitting diodes 6, to DRAIN terminal 7, to junction-type FET 8 (or 1108), and to VCC terminal 14, then as a result, the light-emitting diode 6 emits light faintly.

In the embodiment 8, the LED driving semiconductor circuit 101 is supplied with the power through a path from the DC power supply Vin to IN terminal 1301, to junction-type FET 1108, and to VCC terminal 14. Since the path does not include the light-emitting diode 6, no feeble light is emitted from the light-emitting diodes.

The LED driving semiconductor circuit of the embodiment 8 of the present invention and the LED driving apparatus including the same further have the following effect in addition to the effects shown in the embodiment 7 of the present invention. In the LED driving semiconductor circuit of the embodiment 8 of the present invention and the LED driving apparatus including the same, a feeble light emission from the light-emitting diodes can be avoided while the operation of the switching device 9 is halt (as it is kept in the OFF state).

<<Embodiment 9>>

Figure 14:
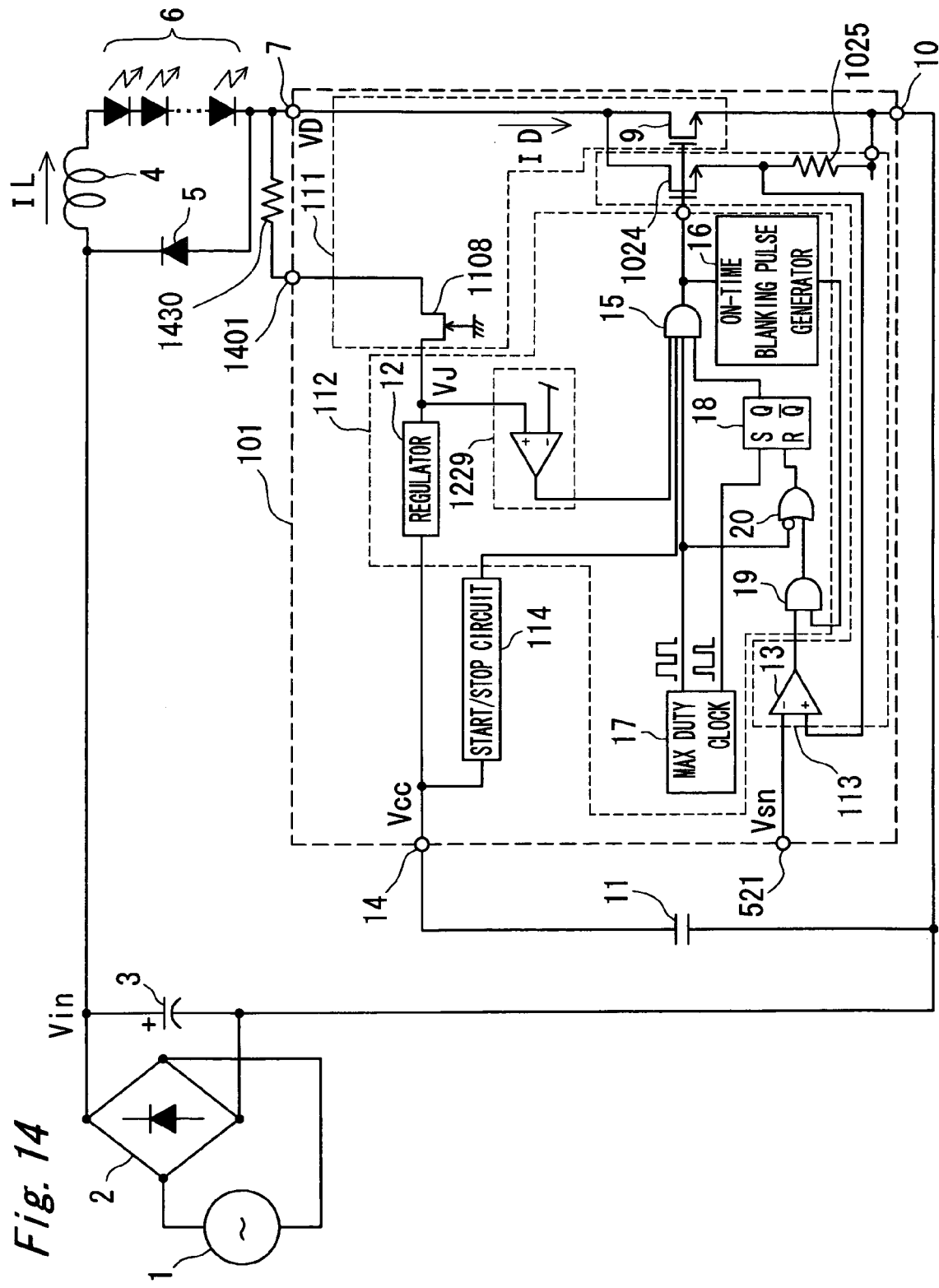
FIG. 14 is a circuit diagram of a LED driving apparatus of an embodiment 9 of the present invention.
Figure 15:
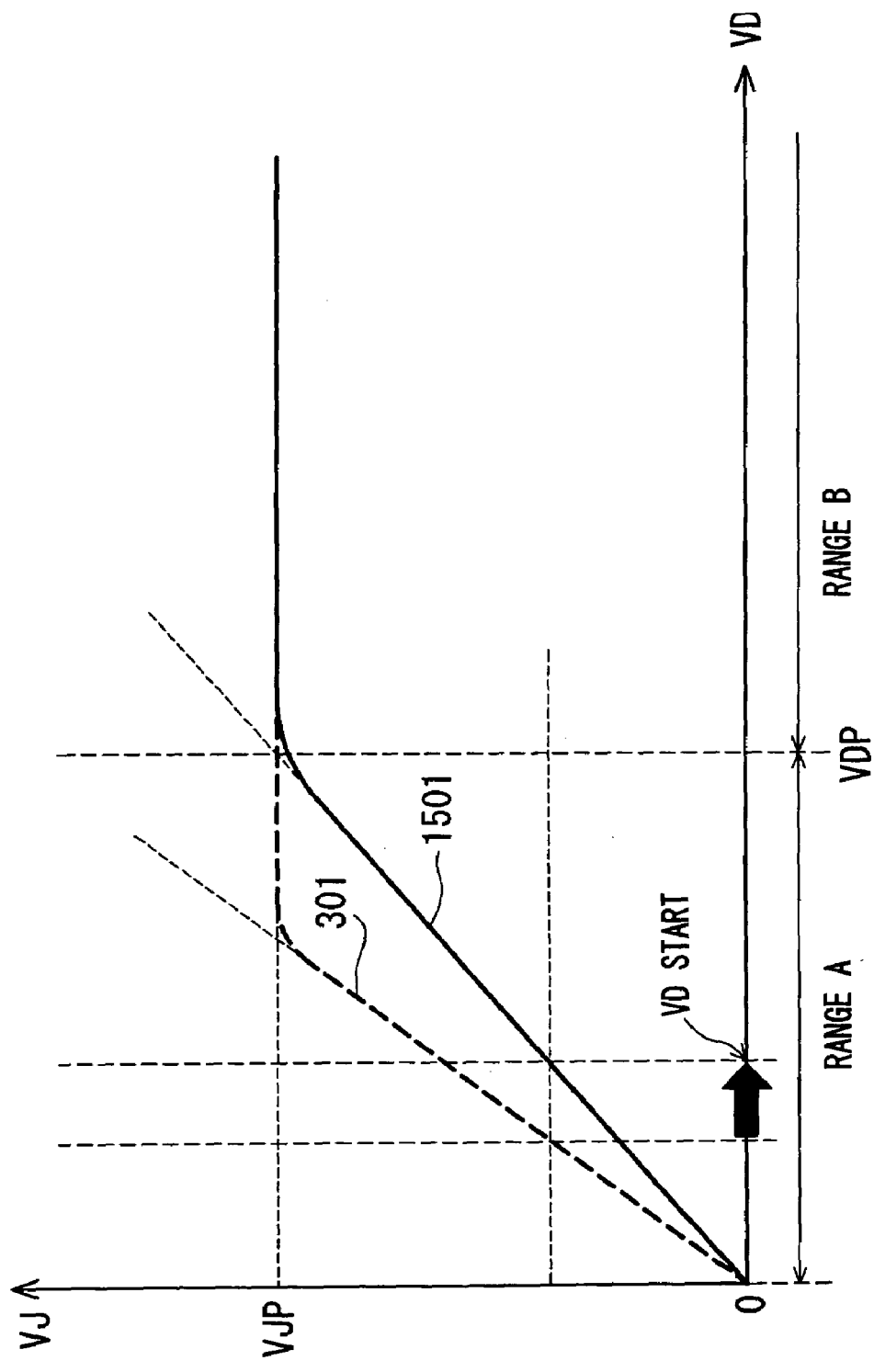
FIG. 15 is a graph showing a relation between voltage VD and voltage VJ of the embodiment 9 of the present invention.

With reference to FIG. 14 and FIG. 15, a LED driving semiconductor circuit and a LED driving apparatus including the same of the embodiment 9 of the present invention will be described. FIG. 14 is a circuit diagram showing the LED driving apparatus of the embodiment 9 of the present invention.

The difference of the LED driving apparatus of the embodiment 9 of the present invention from the embodiment 7 is that an IN terminal 1401 (forth input terminal) and a resistor 1430 which is connected between the cathode terminal of the light-emitting diode 6 and the IN terminal 1401 are added to the configuration of the embodiment 7 shown in FIG. 12. For those other than that, the LED driving semiconductor circuit and the LED driving apparatus including the same of the embodiment 9 of the present invention are basically the same as the embodiment 7 in their circuit configuration and operation.

The resistor 1430 is provided to change the start-up voltage VDSTART and externally connected to the LED driving semiconductor circuit 101. A voltage [voltage VD−resistance value of the resistor 1430×current] is inputted to the IN terminal 1401 via the resistor 1430.

The high potential side of the junction-type FET 1108 is connected to the IN terminal 1401. By a resistor 1430, the voltage VD of the DRAIN terminal 7 and the voltage VJ on the low potential side of the junction-type FET 1108 become as shown in FIG. 15.

FIG. 15 shows a relation of the voltage VD of the DRAIN terminal 7 of the embodiment 9 and the voltage VJ on the low potential side of the junction-type FET 1108. In FIG. 15, a curve 1501 shows the VD–VJ characteristic when a resistor 1430 is included in the embodiment 9 of the present invention and a curve 301 shows the VD–VJ characteristic when a resistor 1430 is not included in the embodiments 1 to 8 of the present invention.

The start-up voltage VDSTART of the embodiment 9 of the present invention shifts to the higher potential side of the VD compared with the state 301 in which the resistor 1430 is not present. The amount of shift depends on the product of the resistance value of resistor 1430 and the current flowing through the junction-type FET 1108. Therefore, if changing the resistance value of the resistor 1430, the start-up voltage VDSTART can easily be changed.

The LED driving semiconductor circuit and the LED driving apparatus including the same of the embodiment 9 of the present invention further have the following effect in addition to the effects shown in the embodiment 7 of the present invention. In the LED driving semiconductor circuit of the embodiment 9 of the present invention and the LED driving apparatus including the same, the variations of the start-up voltage VDSTART can not only be adjusted by the input voltage detection circuit 1229 in the control circuit 112, but also the start-up voltage VDSTART can easily be changed by the change of the resistance value of an external resistor 1430.

<<Embodiment 10>>

Figure 16:
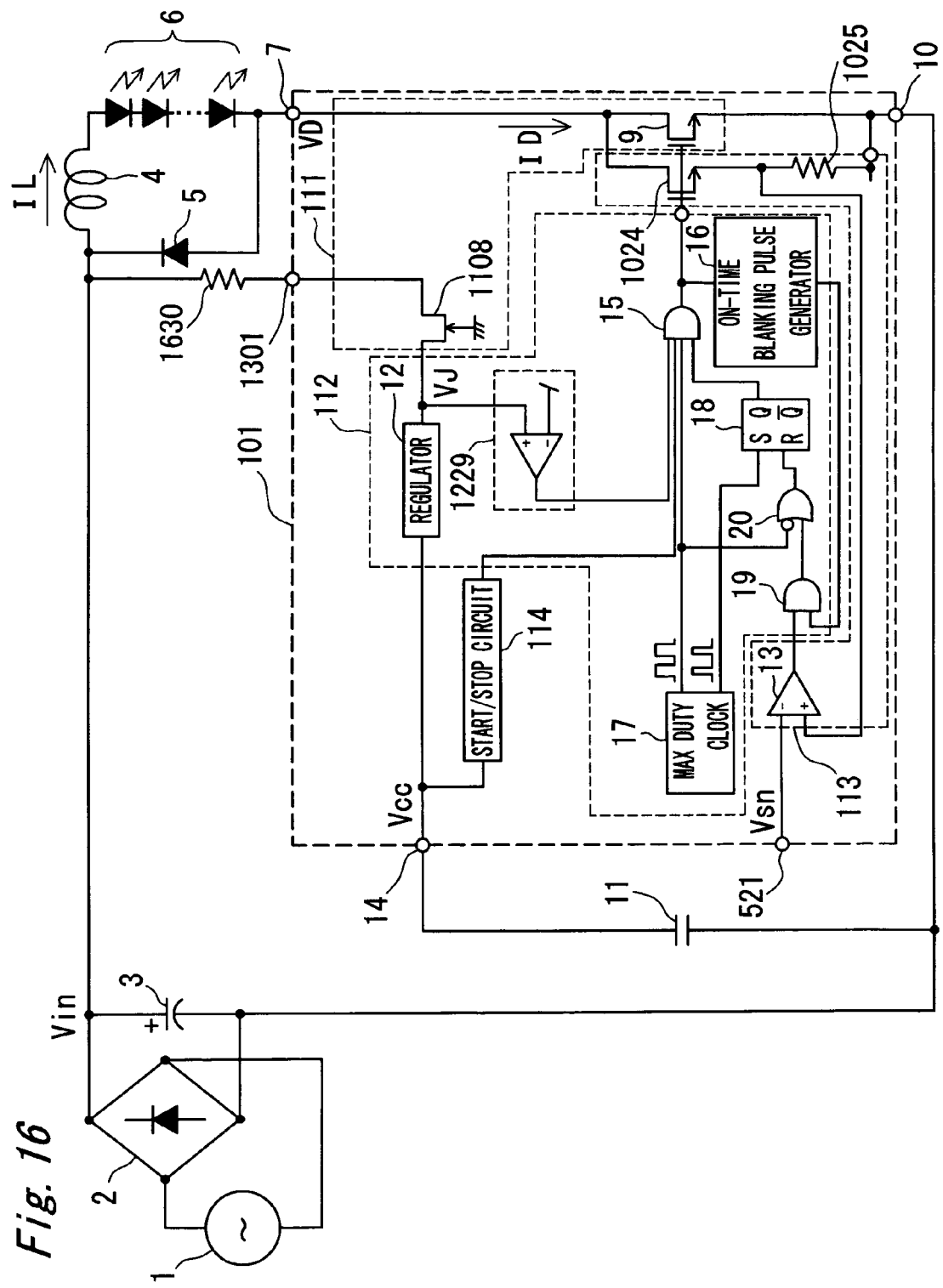
FIG. 16 is a circuit diagram of a LED driving apparatus of an embodiment 10 of the present invention.

With reference to FIG. 16, a LED driving semiconductor circuit and a LED driving apparatus including the same of the embodiment 10 of the present invention will be described. FIG. 16 is a circuit diagram showing the LED driving apparatus of the embodiment 10 of the present invention.

The LED driving apparatus of the embodiment 10 of the present invention has a resistor 1630 added to the configuration of the embodiment 8 shown in FIG. 13, of which one end is connected to a connecting point between the smoothing capacitor 3 and the choke coil 4 and of which the other end is connected to an IN terminal 1301. For those other than that, the LED driving apparatus of the embodiment 10 of the present invention is basically the same as that of the embodiment 8 in its circuit configuration and the operation. In the embodiment 10, the DC voltage Vin is applied to the high potential side of the junction-type FET 1108 through the resistor 1630 and the IN terminal 1301.

The LED driving apparatus of the embodiment 10 of the present invention further has the effect which is the same as that of the embodiment 9 of the present invention shown in FIG. 14 in addition to the effects shown in the embodiment 8 of the present invention. That is, the start-up voltage VDSTART of the embodiment 10 of the present invention is shifted by the resistor 1630 to the higher potential side of the VD compared with the state 301 which is without the resistor 1630 (FIG. 15). The amount of shift depends on the product of the resistance value of the resistor 1630 and the current flowing through the junction-type FET 1108. Therefore, by changing the resistance value of the resistor 1630, the input voltage detection value (VJ), which is inputted to the input voltage detection circuit 1229, can easily be changed. That is, the start-up voltage VDSTART can be changed.

<<Embodiment 11>>

Figure 17:
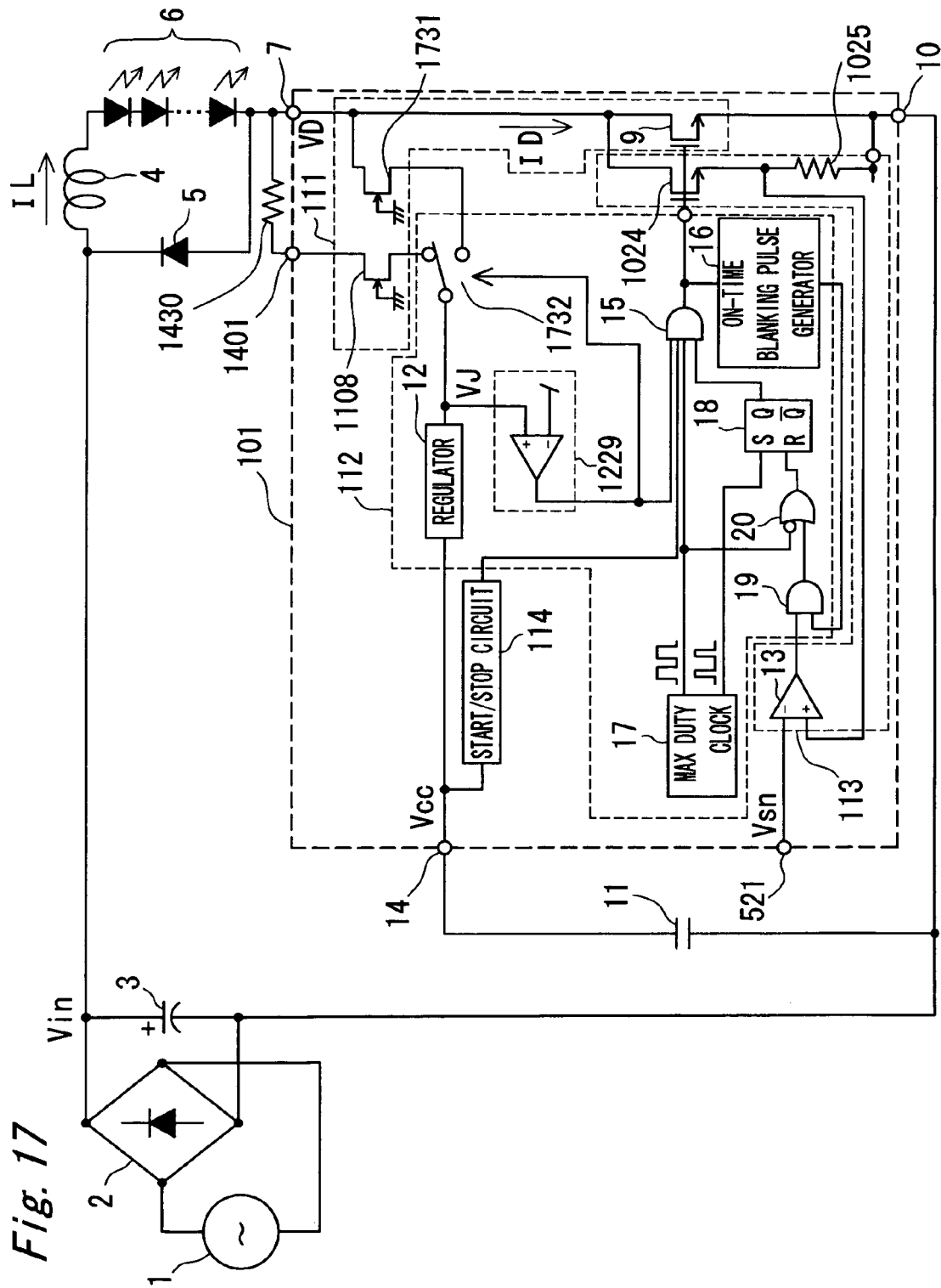
FIG. 17 is a circuit diagram of a LED driving apparatus of an embodiment 11 of the present invention.

With reference to FIG. 17, a LED driving semiconductor circuit and a LED driving apparatus including the same of the embodiment 11 of the present invention will be described. FIG. 17 is a circuit diagram showing the LED driving apparatus of the embodiment 11 of the present invention.

The LED driving apparatus of the embodiment 11 of the present invention has a junction-type FET 1731 and a changeover switch 1732 added to the configuration of the embodiment 9 shown in FIG. 14. For those other than that, the LED driving semiconductor circuit and the LED driving apparatus including the same of the embodiment 11 of the present invention are basically the same as that of the embodiment 9 in their circuit configuration and the operation.

The switching device block 111 of the embodiment 11 further has a junction-type FET 1731. The high potential side of the junction-type FET 1731 is connected to the DRAIN terminal 7 (that is, higher potential side of the switching device 9).

The control circuit 112 of the embodiment 11 further has a changeover switch 1732. A first changeover terminal (which is a upper side terminal in FIG. 17) of the changeover switch 1732 is connected to the low potential side of the junction-type FET 1108. A second changeover terminal (which is a lower side terminal in FIG. 17) is connected to the low potential side of a junction-type FET 1731.

The output side of the changeover switch 1732 is connected to the regulator 12 and the input voltage detection circuit 1229. The changeover switch 1732 changes the connection of the first switchover terminal and the second switchover terminal according to the output signal of the input voltage detection circuit 1229.

In the LED driving apparatus shown in FIG. 17, before the control circuit 112 starts the intermittent ON/OFF control of the switching device 9, the changeover switch 1732 is connected to the junction-type FET 1108. The start-up voltage VDSTART can be changed by the resistor 1430 connected to the high potential side of the junction-type FET 1108.

The control circuit 112 starts the intermittent ON/OFF control of the switching device 9, and at the same time, the connection of the changeover switch 1732 to the regulator 12 is switched over from the junction-type FET 1108 to the junction-type FET 1731 according to the output signal of the input voltage detection circuit 1229. Since the resistor 1430 is not connected between the high potential side of the junction-type FET 1731 and the light-emitting diode 6, the power loss due to the resistor 1430 can be prevented.

The LED driving semiconductor circuit of the embodiment 11 of the present invention and the LED driving apparatus including the same further have the following effect in addition to the effects shown in the embodiment 9 of the present invention. In the LED driving semiconductor circuit and the LED driving apparatus including the same of the embodiment 11 of the present invention, the power loss disappears, which is generated by the resistor 1430 after the control circuit 112 starts the intermittent ON/OFF control of the switching device 9.

Hereupon, in place of connecting the one end of the junction-type FET 1731 to the DRAIN terminal 7, it is also possible to make the connection so as to input the DC voltage Vin. For example, as shown in FIG. 13, providing the input terminal 1301 which the DC voltage Vin is inputted, then connecting the one end of the junction-type FET 1731 to the input terminal 1301, the other end is connected to the changeover switch 1732. Thereby, the present embodiment is further obtained the effect capable of preventing a feeble light emission from the light-emitting diode 6 while stopping the operation of switching device 9 as in the embodiment 8 shown in FIG. 13.

<<Embodiment 12>>

Figure 18:
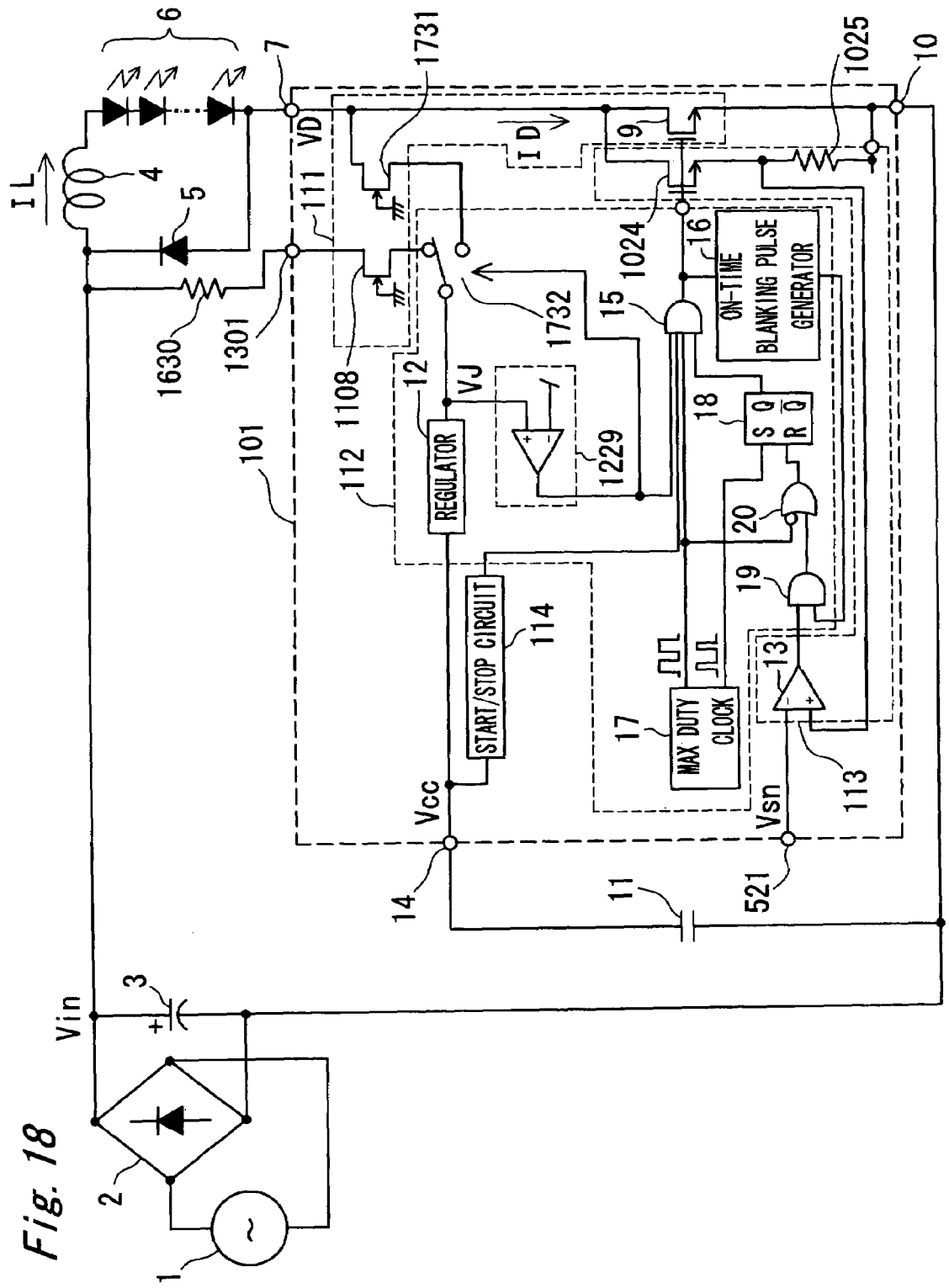
FIG. 18 is a circuit diagram of a LED driving apparatus of an embodiment 12 of the present invention.

With reference to FIG. 18, a LED driving semiconductor circuit and a LED driving apparatus including the same of the embodiment 12 of the present invention will be described. FIG. 18 is a circuit diagram showing the LED driving apparatus of the embodiment 12 of the present invention.

The LED driving semiconductor circuit of the LED driving apparatus of the embodiment 12 of the present invention has the configuration added with a junction-type FET 1731 and a changeover switch 1732 to the configuration of the first embodiment 10 shown in FIG. 16. For those other than that, the LED driving semiconductor circuit and the LED driving apparatus including the same of the embodiment 12 of the present invention are basically the same as those of the embodiment 10 in their circuit configuration and the operation.

A switching device block 111 of the embodiment 12 further has a junction-type FET 1731. The high potential side of the junction-type FET 1731 is connected to the DRAIN terminal 7 (which is a high potential side of the switching device 9).

The control circuit 112 of the embodiment 12 further has a changeover switch 1732. A first changeover switch terminal (which is a upper side terminal in FIG. 18) of the changeover switch 1732 is connected to the low potential side of the junction-type FET 1108. The second changeover switch terminal (which is a lower side terminal in FIG. 18) of the changeover switch 1732 is connected to the low potential side of the junction-type FET 1731.

The output side of the changeover switch 1732 is connected to the regulator 12 and the input voltage detection circuit 1229. The changeover switch 1732 changes the connection of the first changeover switch terminal and the second changeover switch terminal according to the output signal of the input voltage detection circuit 1229.

The LED driving semiconductor circuit and the LED driving apparatus including the same of the embodiment 12 of the present invention further have the effect which is the same as the effect added in the embodiment 11 of the present invention shown in FIG. 17 in addition to the effects shown in the embodiment 10 of the present invention of FIG. 16. That is, the control circuit 112 of the LED driving apparatus of the embodiment 12 shown in FIG. 18 starts the intermittent ON/OFF control of the switching device 9, and at the same time, by the output signal of the input voltage detection circuit 1229, the connection to the regulator 12 of the changeover switch 1732 is switched over from the junction-type FET 1108 to the junction-type FET 1731. Thereby, the power loss due to the resistor 1630 after the ON/OFF control is started can be avoided.

Hereupon, instead of connecting the one end of the junction-type FET 1731 to the DRAIN terminal 7, it is also possible to make the connect so as to input the DC voltage Vin. In this case, the LED driving semiconductor circuit 101 further has an input terminal to which the DC voltage Vin is inputted not through the resistor 1630, besides the input terminal 1301 of FIG. 18. The junction-type FET 1731 is connected between the input terminal and the changeover switch 1732. Thereby, the present embodiment further can be obtained the effect capable of preventing a feeble light emission from the light-emitting diode 6 while stopping the operation of the switching device 9.

<<Embodiment 13>>

Figure 19:
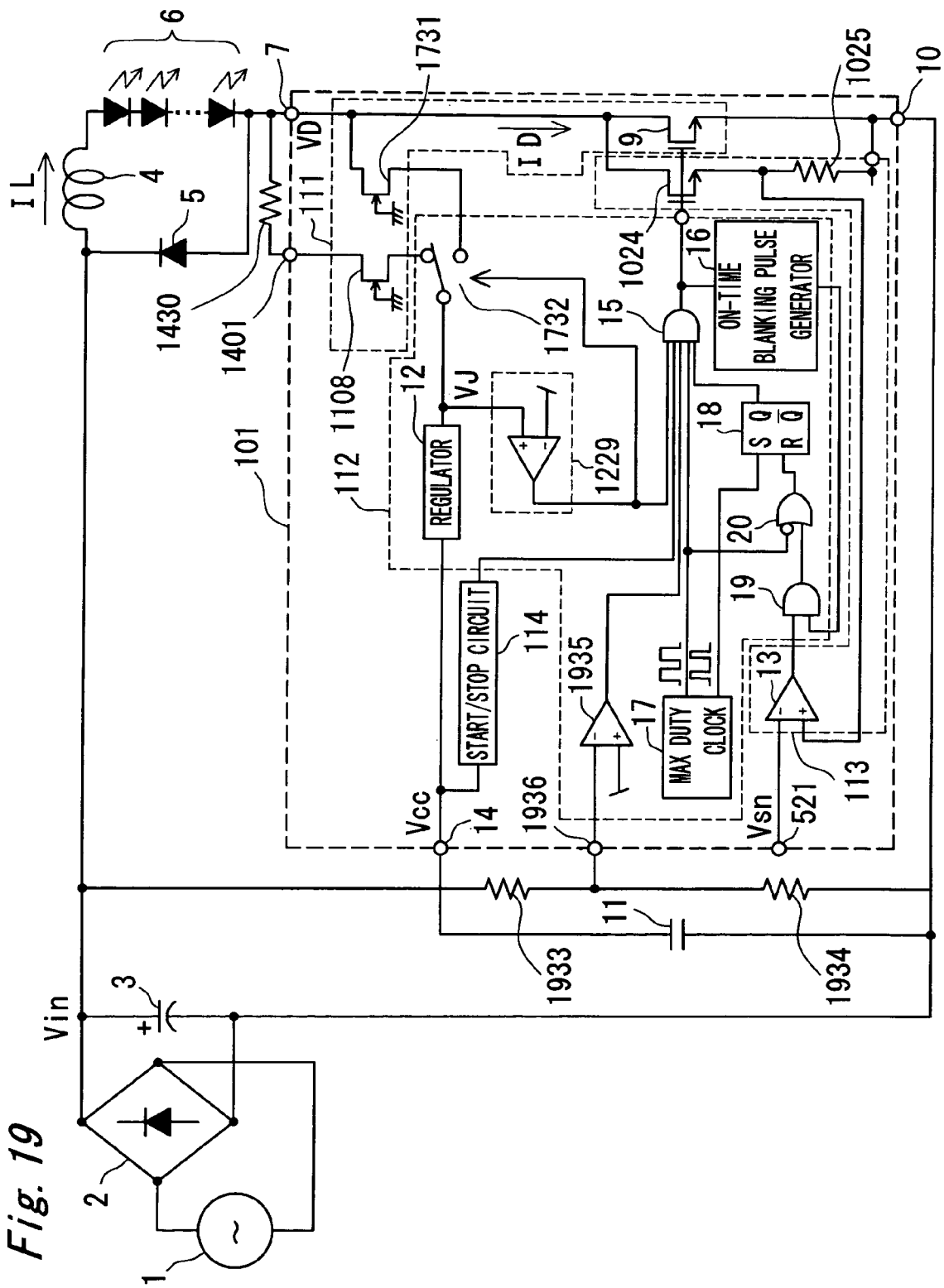
FIG. 19 is a circuit diagram of a LED driving apparatus of an embodiment 13 of the present invention.

With reference to FIG. 19, a LED driving semiconductor circuit and a LED driving apparatus including the same of the embodiment 13 of the present invention will be described. FIG. 19 is a circuit diagram showing the LED driving apparatus of the embodiment 13 of the present invention.

The LED driving apparatus of the embodiment 13 of the present invention has a resistor 1933, a resistor 1934, an input terminal INH 1936 and a comparator 1935 which are added to the configuration of the embodiment 11 shown in FIG. 17. For those other than that, the LED driving semiconductor circuit and the apparatus including the same of the embodiment 13 of the present invention are basically the same as the embodiment 11 in their circuit composition and operation.

The resistor 1933 and the resistor 1934 are connected in series between the connecting point of the smoothing capacitor 3 and the choke coil 4 and the GND/SOURCE terminal 10. The connecting point of the resistor 1933 and the resistor 1934 is connected to the input terminal INH 1936 which is connected to the negative terminal of a comparator 1935. The positive terminal of the comparator 1935 is connected to the internal-circuitry and an output terminal of the comparator 1935 is connected to the AND circuit 15.

In the embodiment 13, the resistor 1933 and the resistor 1934 are connected externally to the LED driving semiconductor circuit 101. The comparator 1935 and the input terminal INH 1936 are included in the LED driving semiconductor circuit 101.

In the LED driving apparatus of the embodiment 13 of the present invention shown in FIG. 19, the DC voltage Vin is divided by the resistor 1933 and the resistor 1934. The divided voltage is inputted to the input terminal INH 1936 and is detected by the comparator 1935. The comparator 1935 compares the voltage with a predetermined value (which is an upper limit value) and outputs a result of comparison to the AND circuit 15.

Consequently, the present invention can prescribe the upper limit value of the input voltage of the IN terminal 1401 or the DRAIN terminal 7 for controlling the intermittent ON/OFF of the switching device 9 by the control circuit 112.

The LED driving semiconductor circuit and the LED driving apparatus including the same of the embodiment 13 of the present invention further have the following effect in addition to the effects shown in the embodiment 11 of the present invention. The LED driving semiconductor circuit and the LED driving apparatus including the same of the embodiment 13 of the present invention can realize that the control circuit 112 controls ON/OFF of the switching device 9 intermittently under a predetermined DC voltage Vin. For example, even when the upper limit of the DC voltage Vin becomes large as in such the case that the fluctuation of AC power source is large, since only such the voltage equal to or less than the prescribed upper-limit value is applied, degradation and/or breakdown of the LED driving apparatus can be prevented. The present invention can secure a higher safety.

<<Embodiment 14>>

Figure 20:
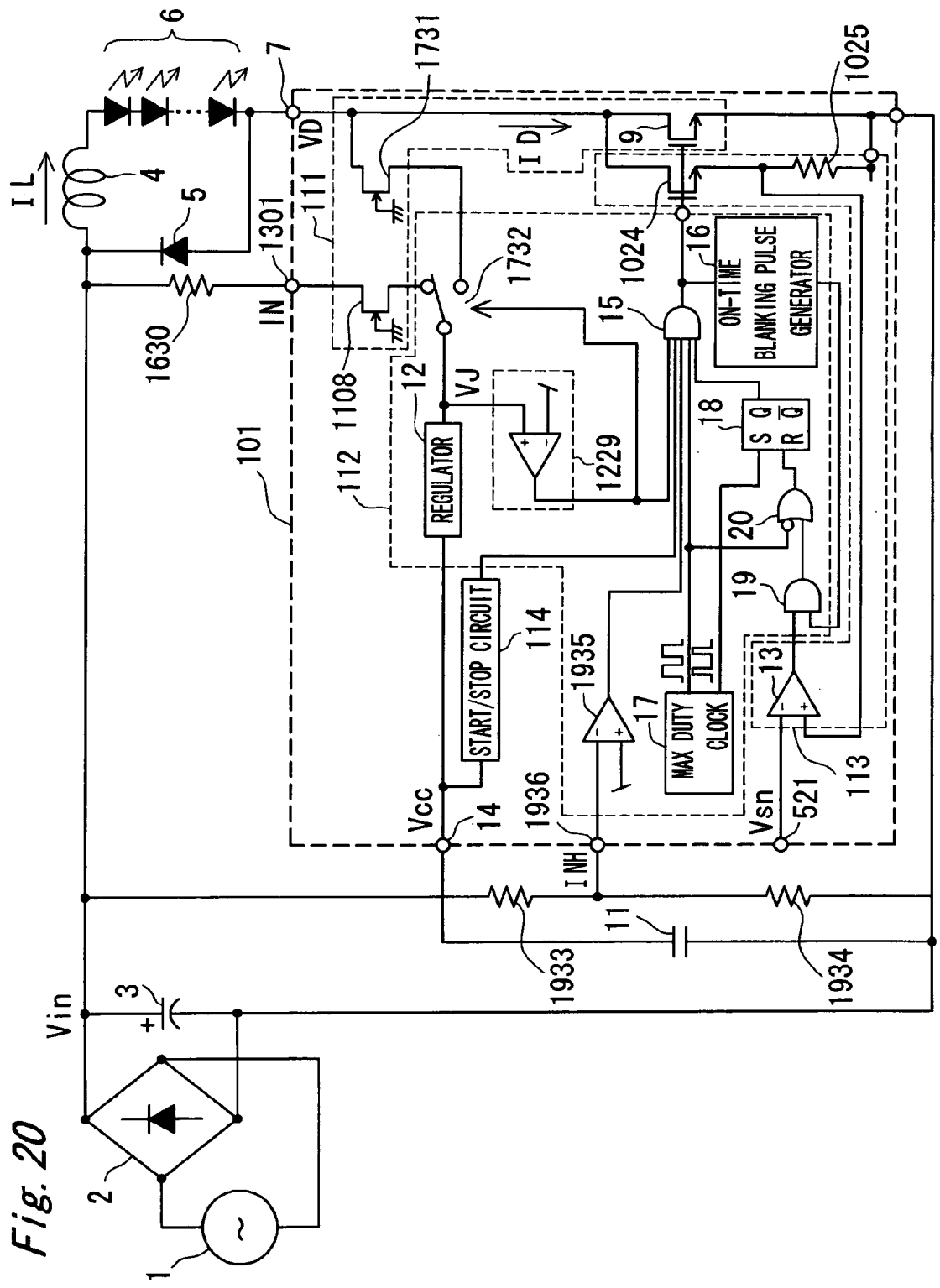
FIG. 20 is a circuit diagram of a LED driving apparatus of an embodiment 14 of the present invention.

With reference to FIG. 20, a LED driving semiconductor circuit and a LED driving apparatus including the same of the embodiment 14 of the present invention will be described. FIG. 20 is a circuit diagram showing the LED driving apparatus of the embodiment 14 of the present invention.

The LED driving apparatus of the embodiment 14 of the present invention has a resistor 1933, a resistor 1934, a comparator 1935 and an input terminal INH 1936 added to the configuration of the embodiment 12 shown in FIG. 18. For those other than that, the LED driving semiconductor circuit and the LED driving apparatus including the same of the embodiment 14 of the present invention are basically the same as those in their circuit composition and operation of embodiment 12. Since resistor 1933, resistor 1934, comparator 1935 and input terminal INH 1936 are identical to those in the embodiment 13 of FIG. 19, their detailed explanation is omitted.

The LED driving semiconductor circuit and the apparatus including the same of the embodiment 14 of the present invention further have the effect of the embodiment 13 shown in FIG. 19 of the present invention in addition to the effects shown in the embodiment 12 of the present invention. That is, the LED driving semiconductor circuit and the LED driving apparatus including the same of the embodiment 14 of the present invention can realize that the intermittent ON/OFF control of the switching device 9 by the control circuit 112 is performed under a predetermined DC voltage Vin. For example, even when the upper limit of the DC voltage Vin becomes large as in such the case that the fluctuation of AC power source is large, since only such the voltage equal to or less than the prescribed upper-limit value is applied, degradation and/or breakdown of the LED driving apparatus can be prevented. The present invention can secure a higher safety.

<<Embodiment 15>>

Figure 21:
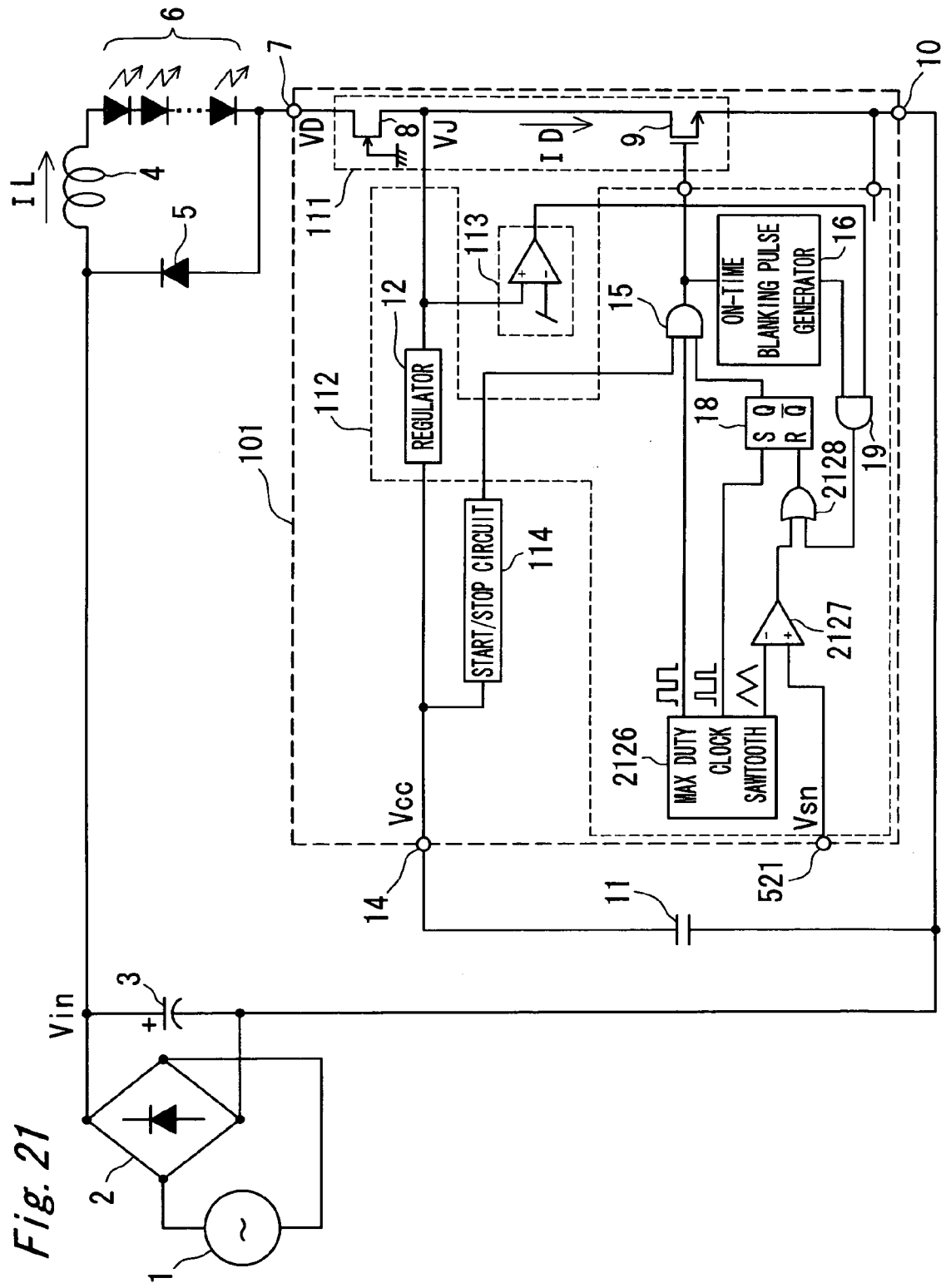
FIG. 21 is a circuit diagram of a LED driving apparatus of an embodiment 15 of the present invention.

With reference to FIG. 21, a LED driving semiconductor circuit and a LED driving apparatus including the same of the embodiment 15 of the present invention will be described. FIG. 21 is a circuit diagram showing the LED driving apparatus of the embodiment 15 of the present invention.

The LED driving semiconductor circuit and the LED driving apparatus including the same of the embodiments 1 to 14 control the current flowing through the light-emitting diode 6 by changing the peak value of the current ID. This is a current mode.

The LED driving semiconductor circuit and the LED driving apparatus including the same of the embodiment 15 control the current flowing through the light-emitting diode by changing the ON period of the switching device 9. This is a voltage mode.

The LED driving apparatus of the embodiment 15 of the present invention shown in FIG. 21 differs from the embodiment 2 of the present invention shown in FIG. 5 in its configuration of the control circuit 112 as follows:

(1) In the drain current detection circuit 113, the current flowing through the switching device 9 is detected by detecting the ON voltage of the switching device 9. In this case, the detection reference voltage is always constant, that is, the maximum value of the current flowing through the switching device 9 is constant all the time.

(2) An oscillator 2126 of the embodiment 15 outputs, in addition to the MAXDUTY signal and the CLOCK signal, a saw tooth wave SAWTOOTH signal. The saw tooth wave SAWTOOTH signal is inputted to a negative-terminal of a comparator 2127. A positive terminal of the comparator 2127 is connected to the external terminal SN 521. The comparator 2127 compares the SAWTOOTH signal and the voltage Vsn applied to the external terminal SN 521 and outputs a result of the comparison. The output terminal of the comparator 2127 is connected to an OR circuit 2128. The OR circuit 2128 inputs the output signal of the comparator 2127 and the output signal of the AND circuit 19 and outputs an output signal to the reset terminal of the RS flip-flop circuit 18. According to this configuration, by changing the input voltage to the external terminal SN 521, the on-duty of the switching device 9 changes. That is, the embodiment 15 of the present invention performs the PWM control.

In case that the LED driving semiconductor circuit and the LED driving apparatus including the same of the embodiment 15 of the present invention is used, although there is the difference from the embodiment 2 in their composition as mentioned above, current and voltage waveforms on its respective terminals are identical with those of FIG. 6. The LED driving semiconductor circuit and the LED driving apparatus including the same of the embodiment 15 of the present invention have the same effects of the embodiment 2 of the present invention.

<<Embodiment 16>>

Figure 22:
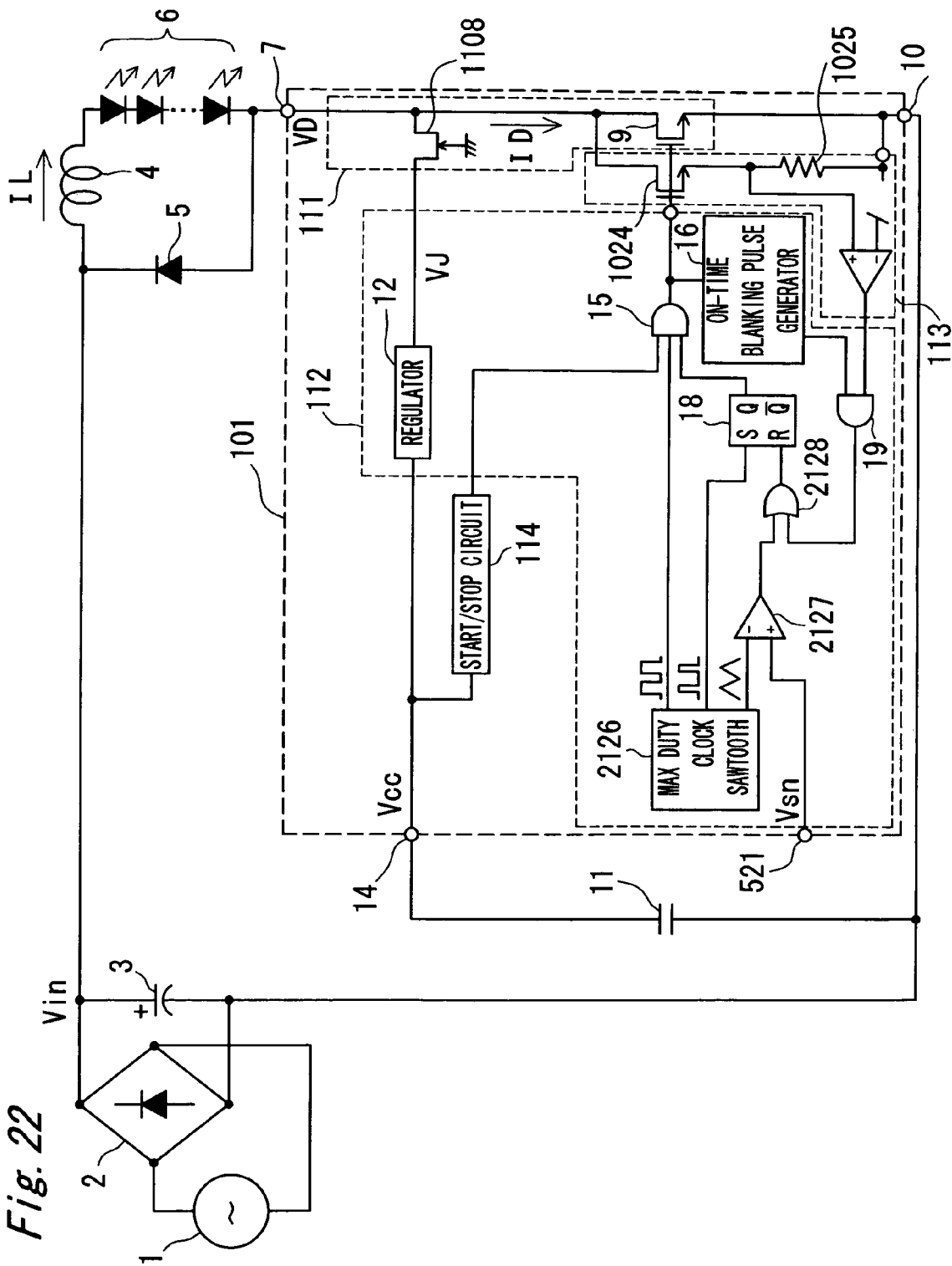
FIG. 22 is a circuit diagram of a LED driving apparatus of an embodiment 16 of the present invention.

With reference to FIG. 22, a LED driving semiconductor circuit and a LED driving apparatus including the same of the embodiment 16 of the present invention will be described. FIG. 22 is a circuit diagram showing the LED driving apparatus of the embodiment 16 of the present invention. In the LED driving semiconductor circuit and the LED driving apparatus including the same of the embodiments 16, as is similar as in the embodiment 15 of FIG. 21, the current flowing through the light-emitting diode 6 is controlled by changing the ON period of the switching device 9 (this is a voltage mode).

The LED driving apparatus of the embodiment 16 of the present invention shown in FIG. 22 differs from the embodiment 15 of the present invention shown in FIG. 21 in its configuration of the switching device block 111 and the drain current detection circuit 113 as follows:

(1) In the drain current detection circuit 111, the junction-type FET 1108 is connected between the DRAIN terminal 7 and the regulator 12 (same as in the embodiment 6 of FIG. 11).

(2) The drain current detection circuit 113 has the switching device 1024 and the resistance 1025 in addition to the comparator 13 (same as in the embodiment 5 of FIG. 10).

When using the LED driving semiconductor circuit and the LED driving apparatus including the same of the embodiment 16 of the present invention, the current and the voltage waveforms of respective terminals become as shown in FIG. 6.

The LED driving semiconductor circuit and the LED driving apparatus including the same of the embodiment 16 of the present invention have the effect that is the same as the embodiment 15 of the present invention shown in FIG. 21. The embodiment 16 of the present invention further also has the effect (the drain current ID can be correctly detected immediately after the moment of the switching-over when the switching device 9 is switched over from OFF state to ON state) of the embodiment 5.

The LED driving semiconductor circuit and the LED driving apparatus including the same of the embodiment 16 of the present invention are suitable when composing the junction-type FET 1108 and the switching device 9 in respectively separated packages.

According to the present invention, it is possible to realize a small sized and the high power conversion efficiency LED driving semiconductor circuit and the LED driving apparatus including the same.

According to the present invention, it is possible to realize a LED driving semiconductor circuit and the LED driving apparatus including the same which are able to control the current flowing through the light-emitting diode with an high accuracy against the change of the input voltage.

The present invention is usable for apparatus and devices in general using the light-emitting diodes and it is useful particularly as the LED lighting apparatus.

The above-described disclosure of the invention in terms of the presently preferred embodiments is not to be interpreted as intended for limiting. Various alterations and modifications will no doubt become apparent to those skilled in the art to which the invention pertains after having read the disclosure. As a corollary to that, such alterations and modifications apparently fall within the true spirit and scope of the invention. Furthermore, it is to be understood that the appended claims be intended as covering the alterations and modifications. The present disclosure relates to subject matter contained in Japanese Patent Application No. 2004-290713, filed on Oct. 01, 2004, which is expressly incorporated herein by reference in its entirety.

What is claimed is:

1. A light-emitting diode driving semiconductor circuit for controlling a light-emitting diode block having
   a choke coil to which a source voltage is applied from a voltage source,
   one or more light-emitting diode connected to said choke coil in series, and
   a diode that supplies a back electromotive force being generated in said choke coil to said light-emitting diode, the diode having one end thereof connected to said choke coil and the other end thereof connected to said light-emitting diode,
   said light-emitting diode driving semiconductor circuit comprising:
   a first input terminal connected to said light-emitting diode;
   a switching device block having a first FET of which one end is connected to said first input terminal or said voltage source, and a first switching device connected between said first input terminal and a ground potential;
   a reference voltage terminal that is connected to the other end of said first FET and outputs a reference voltage;
   a start/stop circuit that outputs a start signal when said reference voltage is equal to or more than a predetermined value, and outputs a stop signal when said reference voltage is less than said predetermined value;
   a current detection circuit that detects a current flowing from said first input terminal to said first switching device; and
   a control circuit that controls ON/OFF of said first switching device intermittently at a predetermined frequency based on the output signal of said start/stop circuit and the output signal of said current detection circuit so that the constant current flows through said light-emitting diode.

2. The light-emitting diode driving semiconductor circuit according to claim 1 wherein in said switching device block said first FET and said first switching device are connected in series between said first input terminal and the ground potential.

3. The light-emitting diode driving semiconductor circuit according to claim 1 wherein said switching device block includes said first FET connected between said first input terminal and said reference voltage terminal, and said first switching device connected between said input terminal and the ground potential.

4. The light-emitting diode driving semiconductor circuit according to claim 1 wherein further comprising a second input terminal to which the source voltage of said voltage source is inputted, wherein
   said switching device block is constituted with said first FET connected between said second input terminal and said reference voltage terminal and said first switching device connected between said first input terminal and the ground potential.

5. The light-emitting diode driving semiconductor circuit according to claim 1 further comprising a regulator between said first FET and said reference voltage terminal.

6. The light-emitting diode driving semiconductor circuit according to claim 1 wherein said current detection circuit detects the current of said first switching device by detecting the ON voltage of the first switching device.

7. The light-emitting diode driving semiconductor circuit according to claim 1 further comprising
   a second switching device having a small constant current ratio with respect to the current flowing through said first switching device, and a resistor connected to said second switching device in series, the second switching device and the resistor being connected in parallel to said first switching device between said first input terminal and the ground potential, wherein
   said current detection circuit detects the current flowing through said first switching device by detecting a voltage across said resistor.

8. The light-emitting diode driving semiconductor circuit according to claim 1 further comprising
   a third input terminal to which a detection reference voltage is applied, wherein
   said control circuit adjusts the light-emission brightness of said light-emitting diode by changing the ON-period of said first switching device according to said detection reference voltage applied from outside to said third input terminal.

9. The light-emitting diode driving semiconductor circuit according to claim 1 further comprising
   an input voltage detection circuit connected to the low potential side of said first FET, wherein
   said control circuit controls ON/OFF of said first switching device intermittently only when the detection voltage of said input voltage detection circuit is equal to or larger than a predetermined value.

10. The light-emitting diode driving semiconductor circuit according to claim 9 further comprising
    a fourth input terminal to which said source voltage or the output voltage of said light-emitting diode is inputted through a resistor, wherein
    the high-voltage side of said first FET is connected to said fourth input terminal, and
    the detection voltage of said input voltage detection circuit is adjusted by said resistor.

11. The light-emitting diode driving semiconductor circuit according to claim 10 further comprising
    a second FET that is connected to said first input terminal to which the output voltage of said light-emitting diode is inputted or connected to a second input terminal to which the source voltage is inputted; and
    a changeover switch circuit having one end capable of being connected to either of said first FET or said second FET and the other end connected to said regulator, wherein
    said changeover switch circuit is connected to said first FET while said detection voltage of the said input voltage detection circuit is smaller than the predetermined value, and is connected to said second FET while said detected voltage is above the predetermined value.

12. The light-emitting diode driving semiconductor circuit according to claim 1 further comprising an overheating protection circuit that detects a temperature of said first switching device, wherein said control circuit turns said first switching device off when the temperature detected by said overheating protection circuit is higher than a predetermined temperature.

13. A light-emitting diode driving apparatus comprising:
a light-emitting diode block having a choke coil to which a source voltage is applied from a voltage source, one or more light-emitting diode connected to said choke coil in series, and a diode that supplies a back electromotive force being generated in said choke coil to said light-emitting diode, the diode having one end thereof connected to said choke coil and the other end thereof connected to said light-emitting diode; and
the LED driving semiconductor circuit according to claim 1 that controls the light-emitting diode block.

14. The light-emitting diode driving apparatus according to claim 13 wherein said light-emitting diode block further has a reverse voltage breakdown prevention circuit that prevents the reverse voltage from being applied to said light-emitting diode.

15. The light-emitting diode driving apparatus according to claim 13 wherein the reverse recovery time of said diode is not more than 100 nsec.

* * * * *

UNITED STATES PATENT AND TRADEMARK OFFICE
CERTIFICATE OF CORRECTION

| | | |
|---|---|---|
| PATENT NO. | : 7,115,888 B2 | Page 1 of 1 |
| APPLICATION NO. | : 11/236818 | |
| DATED | : October 3, 2006 | |
| INVENTOR(S) | : Yoshiaki Hachiya et al. | |

It is certified that error appears in the above-identified patent and that said Letters Patent is hereby corrected as shown below:

ON TITLE PAGE

In Item (56), "References Cited", under "FOREIGN PATENT DOCUMENTS", please add the following:

--FR    2 786 652    6/2000--.

Signed and Sealed this

Twenty-seventh Day of February, 2007

JON W. DUDAS
*Director of the United States Patent and Trademark Office*